US010257564B2

(12) United States Patent
Fay et al.

(10) Patent No.: US 10,257,564 B2
(45) Date of Patent: Apr. 9, 2019

(54) DISTRIBUTED NON-REAL-TIME CONTENT

(71) Applicant: Saturn Licensing LLC, New York, NY (US)

(72) Inventors: Luke Fay, San Diego, CA (US); Frederick J. Zustak, Poway, CA (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/046,566

(22) Filed: Oct. 4, 2013

(65) Prior Publication Data
US 2014/0208375 A1    Jul. 24, 2014

Related U.S. Application Data

(60) Provisional application No. 61/756,279, filed on Jan. 24, 2013.

(51) Int. Cl.
*H04N 7/173*      (2011.01)
*H04N 21/433*     (2011.01)
(Continued)

(52) U.S. Cl.
CPC ....... *H04N 21/433* (2013.01); *H04N 21/4325* (2013.01); *H04N 21/4622* (2013.01); *H04N 21/482* (2013.01)

(58) Field of Classification Search
CPC ............. H04N 21/462; H04N 21/4622; H04N 21/4782; H04N 21/4122; H04N 21/43615;
(Continued)

(56) References Cited

U.S. PATENT DOCUMENTS 8,024,450 B1 * 9/2011 Shiyafetdinov et al. ..... 709/223
8,099,752 B2    1/2012 Eyer
(Continued)

FOREIGN PATENT DOCUMENTS

CN    101073261    11/2007
CN    102301734    12/2011
(Continued)

OTHER PUBLICATIONS

International Search Report and Written Opinion dated May 20, 2014 in PCT/US2014/012034.
(Continued)

*Primary Examiner* — Pankaj Kumar
*Assistant Examiner* — Alazar Tilahun
(74) *Attorney, Agent, or Firm* — Oblon, McClelland, Maier & Neustadt, L.L.P.

(57) ABSTRACT

A method is provided for a reception apparatus to access non-real-time (NRT) content. The method includes receiving, by the reception apparatus, a selection of the NRT content included in a digital television broadcast signal broadcast by a content source. The reception apparatus determines whether the selected NRT content is stored in a memory of the reception apparatus. When the selected NRT content is determined not to be stored in the memory, the reception apparatus determines whether the selected NRT content can be downloaded from an external device that is accessible via a communication network. When the selected NRT content is determined to be downloadable from an external device that is accessible via the communication network, the reception apparatus downloads the selected NRT content from the external device.

18 Claims, 16 Drawing Sheets

(51) Int. Cl.
*H04N 21/462* (2011.01)
*H04N 21/432* (2011.01)
*H04N 21/482* (2011.01)

(58) Field of Classification Search
CPC ......... H04N 21/44227; H04N 21/4788; H04N 21/485; H04N 21/8545; H04N 21/433; H04N 21/4325; H04N 21/482
USPC ... 725/79, 81–85, 86, 90–97, 100, 101, 102, 725/104, 110
See application file for complete search history.

(56) References Cited

U.S. PATENT DOCUMENTS

| | | | |
|---|---|---|---|
| 8,250,607 B2 | 8/2012 | Eyer | |
| 8,307,393 B2 | 11/2012 | Song et al. | |
| 8,346,230 B2 * | 1/2013 | Goodmon | H04H 60/51 455/414.3 |
| 2002/0035730 A1 * | 3/2002 | Ollikainen | H04L 12/1836 725/93 |
| 2009/0133091 A1 * | 5/2009 | Rofougaran | 725/133 |
| 2010/0064317 A1 * | 3/2010 | Shi | H04N 7/17318 725/39 |
| 2010/0162308 A1 * | 6/2010 | Suh et al. | 725/39 |
| 2010/0199318 A1 * | 8/2010 | Chang | H04N 7/17318 725/97 |
| 2011/0016494 A1 | 1/2011 | Linhardt | |
| 2011/0075990 A1 | 3/2011 | Eyer | |
| 2011/0088075 A1 | 4/2011 | Eyer | |
| 2011/0239263 A1 * | 9/2011 | Kim | H04N 21/4347 725/110 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0289542 A1 * | 11/2011 | Kitazato et al. | 725/115 |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2011/0321114 A1 * | 12/2011 | Newell | 725/146 |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0096495 A1 | 4/2012 | Matsunaga | |
| 2012/0185888 A1 | 7/2012 | Eyer et al. | |
| 2012/0226775 A1 | 9/2012 | Suh et al. | |
| 2012/0253826 A1 | 10/2012 | Kitazato et al. | |
| 2012/0259994 A1 * | 10/2012 | Gillies et al. | 709/231 |
| 2012/0274848 A1 | 11/2012 | Kitahara et al. | |
| 2012/0275764 A1 | 11/2012 | Eyer | |
| 2013/0019269 A1 * | 1/2013 | Hymel | 725/62 |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |

FOREIGN PATENT DOCUMENTS

CN 102823266 12/2012
KR 10-2011-0116023 A 10/2011

OTHER PUBLICATIONS

U.S. Appl. No. 13/216,375, filed Aug. 24, 2011, Hattori, et al.
U.S. Appl. No. 12/980,917, filed Dec. 29, 2010, Dewa.
U.S. Appl. No. 13/107,604, filed May 13, 2011, Dewa.
U.S. Appl. No. 13/238,080, filed Sep. 21, 2011, Kitazato, et al.
U.S. Appl. No. 13/212,972, filed Aug. 18, 2011, Kitazato.
U.S. Appl. No. 13/220,231, filed Aug. 29, 2011, Kitahara, et al.
U.S. Appl. No. 13/081,566, filed Apr. 7, 2011, Kitazato, et al.
U.S. Appl. No. 13/038,939, filed Mar. 2, 2011, Eyer.
U.S. Appl. No. 12/985,241, filed Jan. 5, 2011, Eyer.
U.S. Appl. No. 13/043,170, filed Mar. 8, 2011, Eyer.
U.S. Appl. No. 13/041,743, filed Mar. 7, 2011, Eyer.
U.S. Appl. No. 13/039,005, filed Mar. 2, 2011, Eyer.
U.S. Appl. No. 13/071,560, filed Mar. 25, 2011, Yamagishi.
U.S. Appl. No. 13/071,559, filed Mar. 25, 2011, Yamagishi, et al.
U.S. Appl. No. 13/071,238, filed Mar. 24, 2011, Yamagishi.
U.S. Appl. No. 13/075,440, filed Mar. 30, 2011, Yamagishi, et al.
U.S. Appl. No. 12/881,361, filed Sep. 14, 2010, Eyer.
U.S. Appl. No. 13/046,579, filed Mar. 11, 2011, Eyer.
U.S. Appl. No. 13/206,627, filed Aug. 10, 2011, Kitazato.
U.S. Appl. No. 13/238,065, filed Sep. 21, 2011, Kitazato.
U.S. Appl. No. 12/942,835, filed Nov. 9, 2010, Eyer.
U.S. Appl. No. 13/009,720, filed Jan. 19, 2011, Eyer, et al.
U.S. Appl. No. 13/304,126, filed Nov. 23, 2011, Eyer.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 13/239,871, filed Sep. 22, 2011, Kitazato.
U.S. Appl. No. 13/238,138, filed Sep. 21, 2011, Kitazato.
U.S. Appl. No. 13/238,277, filed Sep. 21, 2011, Kitazato.
U.S. Appl. No. 13/238,264, filed Sep. 21, 2011, Kitazato.
U.S. Appl. No. 12/798,118, filed Mar. 30, 2010, Eyer.
U.S. Appl. No. 13/038,984, filed Mar. 2, 2011, Eyer.
U.S. Appl. No. 13/038,967, filed Mar. 2, 2011, Eyer.
U.S. Appl. No. 12/959,529, filed Dec. 3, 2010, Blanchard, et al.
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/562,946, filed Jul. 31, 2012, Eyer.
U.S. Appl. No. 13/559,166, filed Jul. 26, 2012, Eyer.
U.S. Appl. No. 13/490,216, filed Jun. 6, 2012, Eyer.
U.S. Appl. No. 13/554,688, filed Jul. 20, 2012, Eyer.
U.S. Appl. No. 13/559,188, filed Jul. 26, 2012, Kitazato.
U.S. Appl. No. 13/527,435, filed Jun. 19, 2012, Eyer.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.

(56) References Cited

OTHER PUBLICATIONS

U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
U.S. Appl. No. 13/934,581, filed Jul. 3, 2013, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
U.S. Appl. No. 13/963,138, filed Aug. 9, 2013, Fay et al.
U.S. Appl. No. 13/963,111, filed Aug. 9, 2013, Fay et al.
U.S. Appl. No. 13/968,035, filed Aug. 15, 2013, Eyer et al.
U.S. Appl. No. 14/025,310, filed Sep. 12, 2013, Dewa.
U.S. Appl. No. 14/026,551, filed Sep. 13, 2013, Yamagishi.
Office Action dated Jul. 6, 2017 in Chinese Patent Application No. 201480005300.7 (With English Translation).
Office Action dated Jun. 1, 2016 in Korean Patent Application No. 10-2015-7019651 (with English language translation).
Office Action dated Sep. 28, 2016 in Canadian Patent Application No. 2,898,833.

* cited by examiner

IPv4 Packets :

| Version | IHL | DSCP | ECN | Total Length | |
|---|---|---|---|---|---|
| Identification | | | Flags | Fragment Offset | |
| Time to Live | | Protocol | | Header Checksum | |
| Source IP Address | | | | | |
| Destination IP Address | | | | | |
| IP Data | | | | | |

Example:

IP Address :       11100000.00000000.00010111.00111100
Subnet Mask :      11111111.11111111.11111111.00000000
Network Prefix :   11100000.00000000.00010111.00000000
Host Part :        00000000.00000000.00000000.00111100

Subnets allow for efficient routing and parsing of services

One specific IP address and port number, 224.0.23.60:4937 is recognized as the Service Signaling Channel (SSC) and is registered by ATSC with the Internet Assigned Numbers Authority for A/153.

Non-Real-Time services for fixed broadcast are delivered within these IP subnets; the particular IP subnets (IP addresses) referenced from a TVCT; given in this Service Signaling Channel. Fixed service and Mobile service obtain NRT content description from this SSC (SMT and NRT-IT).

FIG. 15

DISTRIBUTED NON-REAL-TIME CONTENT

CROSS-REFERENCE TO RELATED APPLICATIONS

This application is related to and claims priority under 35 U.S.C. § 119(e) to U.S. provisional patent application No. 61/756,279, filed Jan. 24, 2013, which is incorporated herein by reference in its entirety.

BACKGROUND OF THE INVENTION

Field of the Invention

Embodiments described herein relate generally to storing and accessing content. More particularly, embodiments described herein relate generally to the storing and accessing of non-real-time (NRT) content broadcast from a content source.

Background

Modern consumer electronic devices such as televisions, set top boxes, mobile devices, etc. are capable of receiving a plurality of different types of content. Depending on the type of consumer electronic device, the content can be broadcast, streamed, or retrieved and stored locally for presentation to a user.

SUMMARY OF THE INVENTION

According to an embodiment of the present disclosure, there is provided a reception apparatus. The reception apparatus includes a receiver, a memory, and at least one processor. The receiver is configured to receive NRT content included in a digital television broadcast signal broadcast from a content source. The memory is configured to store the NRT content. The at least one processor is configured to receive a selection of the NRT content and determine whether the selected NRT content is stored in the memory. When the at least one processor determines that the selected NRT content is not stored in the memory, the at least one processor determines whether the selected NRT content can be downloaded from an external device that is accessible via a communication network. Further, when the at least one processor determines that the selected NRT content can be downloaded from an external device that is accessible via the communication network, the at least one processor downloads the selected NRT content from the external device.

According to an embodiment of the present disclosure, there is provided a method of a reception apparatus for accessing NRT content. The method includes receiving, by the reception apparatus, a selection of the NRT content included in a digital television broadcast signal broadcast by a content source. The reception apparatus determines whether the selected NRT content is stored in a memory of the reception apparatus. When the selected NRT content is determined not to be stored in the memory, the reception apparatus determines whether the selected NRT content can be downloaded from an external device that is accessible via a communication network. When the selected NRT content is determined to be downloadable from an external device that is accessible via the communication network, the reception apparatus downloads the selected NRT content from the external device.

Further, according to an embodiment of the present disclosure, there is provided a non-transitory computer-readable storage medium having instructions embedded therein, which, when executed by a computer, cause the computer to perform the method of the reception apparatus discussed above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 15 illustrates an exemplary Internet Protocol (IP) packet for the NRT content.

DETAILED DESCRIPTION

Figure 1:
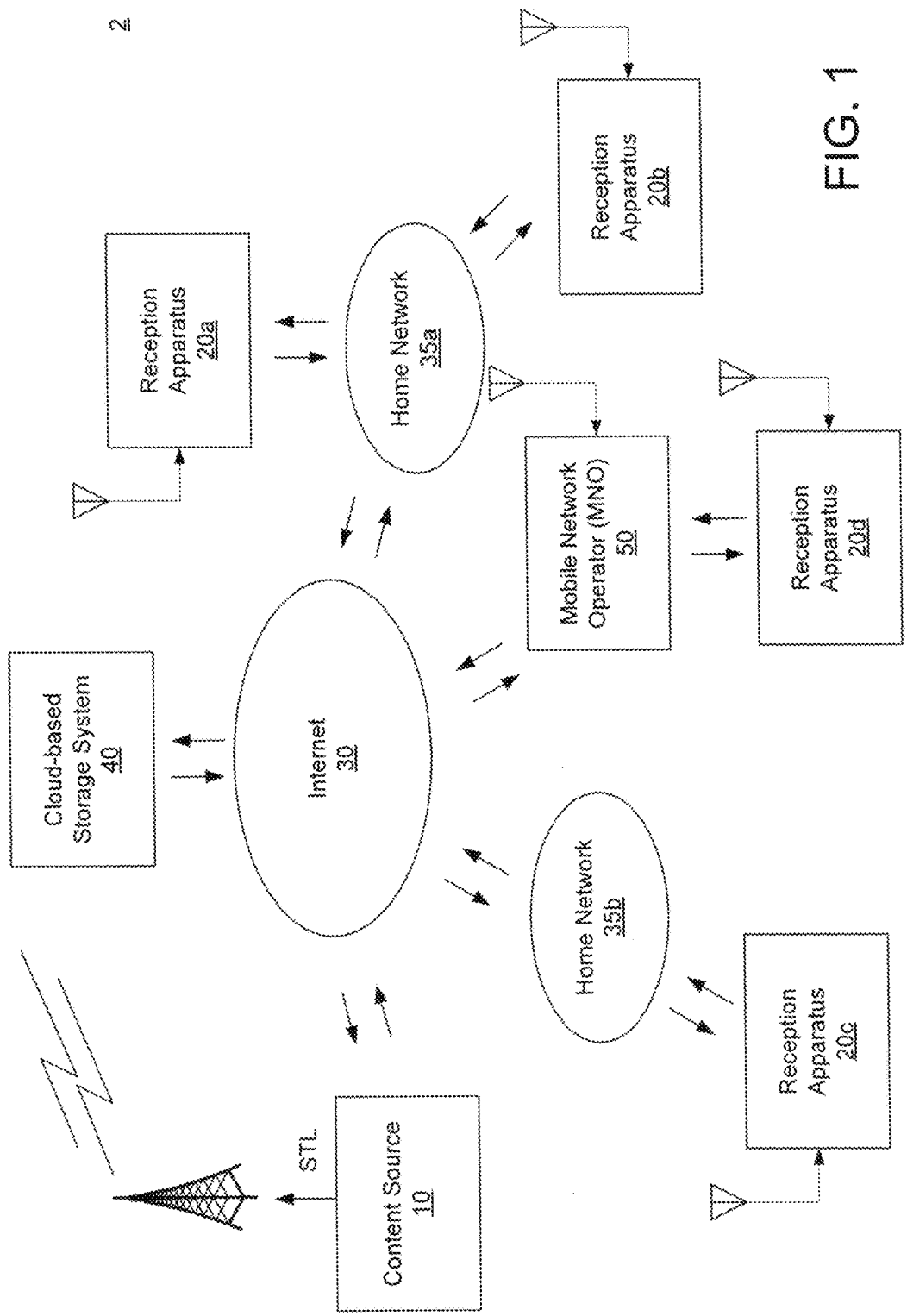
FIG. 1 illustrates an exemplary system for storing and/or accessing NRT content.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the disclosure are described with respect to NRT content provided in a digital television broadcast signal broadcast by a content source. In one embodiment, the NRT content is broadcast by the content source in advance of use (i.e., not streaming content), for example, as defined in ATSC standard A/103.

Examples of NRT content include any one or a combination of media content such as video/audio entertainment programming including television programs, movies, events (e.g., sporting events), music, and radio programs, push video on demand (e.g., content ranging from short-form video clips to feature length movies); printed publications (e.g., magazines); news information and weather services; personalized television channels; reference information on a wide range of topics; web pages; web-portals; news feeds; etc. Examples of non-media content include software applications, software updates, data files, etc. NRT content is also described in U.S. Pat. Nos. 8,099,752 and 8,250,607 which are incorporated herein by reference in their entirety.

In some embodiments, the NRT content is associated with primary content, which is included in the digital television broadcast signal. In one embodiment, the primary content includes one or more television programs that are broadcast in real-time. The NRT content is presented to a user during the broadcast of the primary content. In another embodiment a user is simply notified of the availability of the NRT content. For example, a movie advertisement presented during a commercial break in the primary content may be associated with NRT content including the movie for download. In another example, when the primary content is a sporting event, the primary content may be associated with NRT content that includes player statistics.

Although embodiments of the present disclosure are described with respect to NRT content that is broadcast in a digital television broadcast signal by a content source via a terrestrial broadcast transmission, the NRT content, and any associated primary content, may be provided via other communication methods such as via the Internet, cable television transmission, satellite television transmission, radio transmission, or other broadcast or communication networks such as a private local area network (LAN), a mobile data network (e.g., 3G, 4G, or Long Term Evolution (LTE) mobile data networks), evolved Multicast Broadcast Multimedia Service (eMBMS) broadcast, etc. eMBMS is defined in the 3GPP specifications, which include release 1999 and releases 4-12 incorporated herein by reference in their entirety.

Further, although embodiments of the present disclosure are described with respect to NRT content. Other types of content, including the primary content and/or other real-time content, can be accessed or stored in other embodiments.

FIG. 1 illustrates an exemplary system 2 for storing and/or accessing NRT content. The system is configured to provide NRT content to a plurality of reception apparatuses 20a-20d. The system 2 includes a content source 10 (e.g., a digital television broadcaster), the reception apparatuses 20a-20d, a cloud-based storage system 40, and a mobile network operator (MNO) 50. The reception apparatuses 20a, 20b are connected to a home network 35a. The reception apparatus 20c is connected to a home network 35b. In one embodiment, the home networks 35a, 35b are associated with different subnets. In another embodiment, each of the reception apparatuses 20a-20d is connected to the same subnet. The content source 10, cloud-based storage system 40, MNO 50, and home networks 35a, 35b are connected to the Internet 30.

The system 2 is not limited to the specific number of, and connections between, the networks and components illustrated in FIG. 1. It should be understood that, in other embodiments, any number of each component (including zero), or combination thereof, can be included in the system 2. Further, the reception apparatuses 20a-20d may be communicatively coupled to each over any one or a combination of different communication networks (e.g., local area network, wireless local area network, wide area network, cellular network, cable television network, home network, Internet, etc.).

The content source 10 broadcasts a digital television broadcast signal carrying content, including primary and/or NRT content. It is noted that the NRT content need not be associated with primary content. In the case of primary content, the audio/video content is divided into a video elementary stream (ES) and an audio ES corresponding to the video and audio portions of the content. The video ES and audio ES are multiplexed with the NRT content to form a broadcast multiplex, such as an MPEG-2 Transport Stream (TS).

In other embodiments, the content source 10 provides the primary and/or NRT content via one or a combination of the terrestrial broadcast, a satellite broadcast, a cable television transmission, cellular network (e.g., eMBMS), and other data communication networks such as a local area network (LAN), wide area network (WAN), or the Internet 30.

The content source 10 broadcasts digital television broadcast signals in accordance with, for example, standards set by the Advanced Television Systems Committee (ATSC) such as ATSC standards A/53, A/103, and/or A/153, which are incorporated herein by reference in their entirety. For example, the content source 10 broadcasts content using a broadcast tower via a studio to transmitter link (STL).

When a digital television broadcast signal includes primary content and NRT content associated with the primary content, the primary content corresponds to a main program while the NRT content corresponds to supplemental content that is related to the main program. For example, the primary content is a live basketball game while the NRT content includes statistics for players playing in the basketball game.

In one embodiment, the primary content provided by the content source 10 includes one or more television programs, without regard to whether the program is a movie, sporting event, segment of a multi-part series, news broadcast, etc. Further, the primary content provided by the content source 10 may also include advertisements, infomercials, and other program-like content which may not be reported as a program in an EPG.

The reception apparatuses 20a-20d receive the digital television broadcast signal broadcast by the content source 10. In one embodiment, when any one of the reception apparatuses 20a-20d determines that NRT content is needed (e.g., to be presented to a user), the one of the reception apparatuses 20a-20d determines whether the NRT content is stored locally. When the NRT content is determined not to be stored locally, the one of the reception apparatuses 20a-20d determines whether the NRT content can be downloaded, or otherwise retrieved, from an external device (e.g., another one of the reception apparatuses 20a-20d, the cloud-based storage system 40, the MNO 50, the content source 10, etc.)

Further, in one embodiment, the reception apparatuses 20a-20d are configured to cause an external device (e.g., another one of the reception apparatuses 20a-20d, the cloud-based storage system 40, the MNO 50, the content source 10, etc.) to store selected NRT content for subsequent retrieval on demand.

The MNO 50 is configured to communicate with the reception apparatus 20d via a cellular network. In one embodiment, the reception apparatus 20d is a mobile device such as a smartphone, tablet computer, laptop, portable computer, etc. However, the reception apparatus 20d may be a fixed or stationary device such as a television set if configured to communicate over the cellular network.

Depending on the embodiment, the MNO 50 receives none, one, or a combination of the primary and NRT content broadcast from the content source 10. In one embodiment, the MNO 50 receives and stores the broadcast NRT content while the reception apparatus 20d receives the primary content from the digital television broadcast signal. In another embodiment, the MNO 50 receives both the primary and NRT content and provides the same to the reception apparatus 20d via the cellular network, for example via an eMBMS broadcast.

The cloud-based storage system 40 is configured to store a copy of the NRT content for access on demand. Although the cloud-based storage system 40 is illustrated as a separate component in FIG. 1, in another embodiment, the cloud-based storage system 40 or storage function thereof is incorporated in the content source 10 or MNO 50. In other embodiments, the cloud-based storage system 40 or storage function thereof is incorporated in a consumer electronics device (e.g., a PC, another reception apparatus, etc.). The cloud-based storage system 40 is configured to automatically store NRT content provided by the content source 10, and/or store NRT content in response to a user request.

Fees can be assessed for the NRT content using one or a combination of the Purchase Item Table (PIT) and Purchase Terms and Channel Table (PTCT) defined in ATSC standard A/103. The PIT has entries which define a purchase item which can be a service or content. This can be thought of as a list of possible tagged items offered for sale. The PTCT contains terms of a purchase (price) and channel entries providing contact information. These two tables are related and can reference each other to provide billing information to broadcasters when a purchase is made. These tables are referenced for sending information back to the NRT content provider (e.g., content source 10).

In some embodiments, the NRT content is subject to digital rights management (DRM), which is handled by the reception apparatus 20 or embedded into the NRT content provided to the reception apparatus 20. For example, the reception apparatus 20 can prohibit the transfer of received NRT content to another device, limit the number of times the on-demand content can be played back, etc.

In some embodiments, NRT content is associated with a triggered declarative object (TDO) trigger and/or TDO. In one embodiment, the TDO trigger identifies a particular TDO to be executed during a primary content broadcast. The TDO notifies the user of the availability of the NRT content or causes the reception apparatus 20 to automatically present the NRT content. In another embodiment, the TDO trigger identifies NRT content to be downloaded in advance.

In one embodiment, the TDO trigger includes primary content and TDO identifiers. The primary content identifier is used by the reception apparatus 20 to determine which content the TDO trigger is associated with, and the TDO identifier is used by the reception apparatus 20 to determine which TDO to execute in response to the TDO trigger. Further, in one embodiment, the TDO trigger references the location where an associated TDO may be acquired, such as a file name or identifier for a file that has already been downloaded via NRT services.

The TDO is a downloadable software object. Generally, such objects have declarative content (e.g., text, graphics, scripts, and audio) whose function and behavior is tied in some way to the content it is associated with. The TDO can be stored in the reception apparatus 20 in advance or retrieved when an associated TDO trigger is activated during a primary content broadcast. Various standards bodies may define associated available behaviors, appearance, trigger actions, and transport methods for content and metadata for a TDO.

Figure 2:
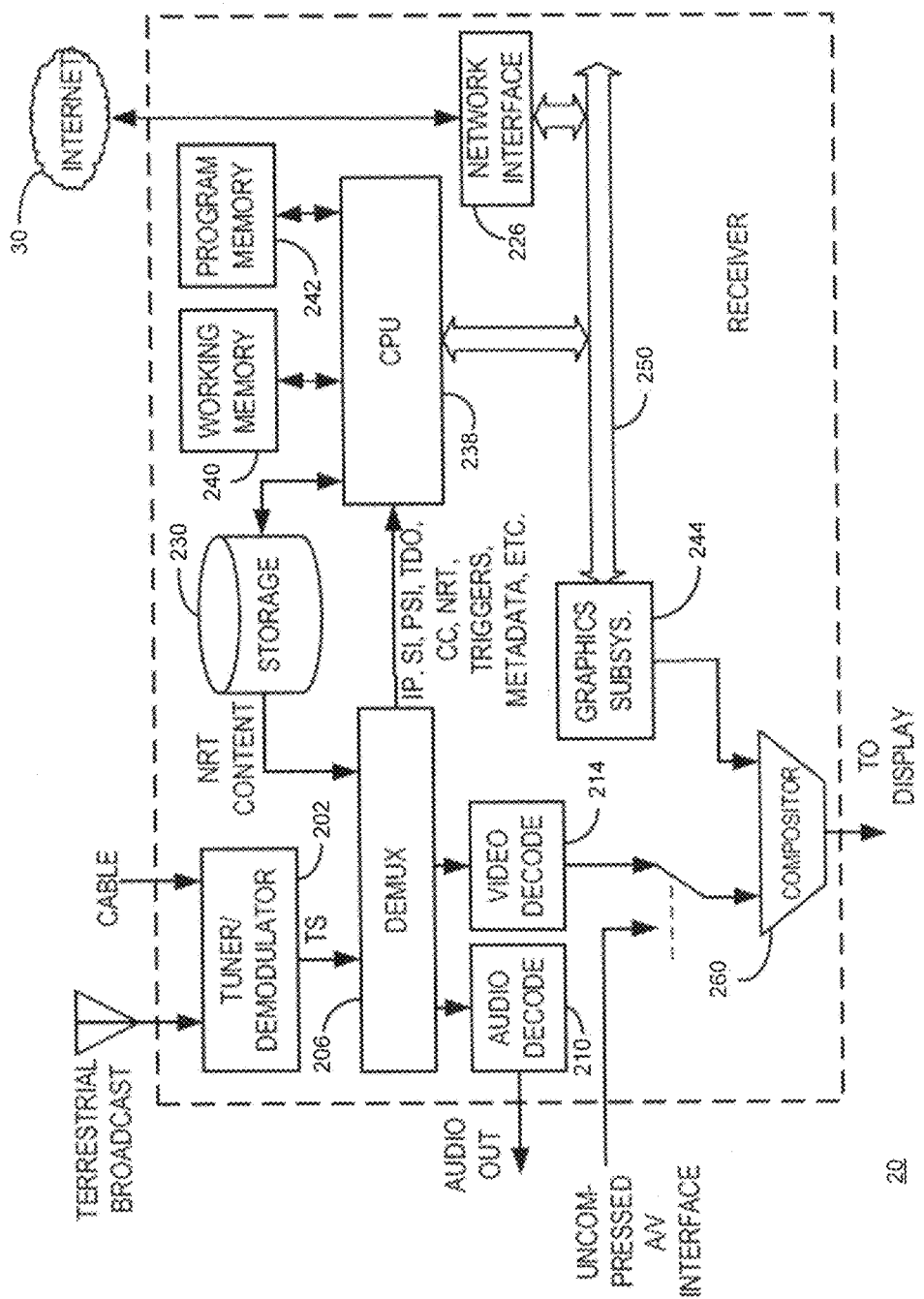
FIG. 2 is a block diagram of an exemplary reception apparatus.

FIG. 2 illustrates an exemplary reception apparatus 20. The reception apparatus 20 includes a digital television receiver device that is incorporated into a fixed or mobile device such as a television set, a set top box, smartphone, tablet computer, laptop, portable computer, or any other device configured to receive television content.

The reception apparatus 20 includes a tuner/demodulator 202, which receives digital television broadcast signals from one or more content sources (e.g., content source 10) via, for example, a terrestrial broadcast. Depending on the embodiment, the reception apparatus 20 may alternatively or additionally be configured to receive a cable television transmission or a satellite broadcast. The tuner/demodulator 202 receives an MPEG-2 TS, which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface), if available.

In one embodiment, the MPEG-2 TS includes supplemental data such as one or a combination of closed caption data, a TDO, a TDO trigger, a virtual channel table, EPG data, NRT content, etc. The supplemental data are separated out by the demultiplexer 206. However, the A/V content and/or the supplemental data may be received via the Internet 30 and a network interface 226. Further, an instruction to store the NRT content in an external device may be sent via the network interface 226.

A storage unit 230 is provided to store the NRT or Internet-delivered content such as Internet Protocol Television (IPTV). The stored content can be played by demultiplexing the content stored in the storage unit 230 by the demultiplexer 206 in a manner similar to that of other sources of content. Alternatively, the stored content may be processed and presented to the user by the CPU 238. The storage unit 230 may also store any other supplemental data acquired by the reception apparatus 20.

The reception apparatus 20 generally operates under control of at least one processor, such as the CPU 238, which is coupled to a working memory 240, program memory 242, and a graphics subsystem 244 via one or more buses (e.g., bus 250). The CPU 238 receives closed caption data from the demultiplexer 206 as well as any other supplemental data used for rendering graphics, and passes appropriate instructions and data to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of NRT content, TDO triggers, TDOs, EPG data, etc. For example, the CPU 238 operates to execute script objects (control objects) contained in the TDO, its trigger(s), etc., using for example a Declarative Object (DO) Engine stored in the program memory 242.

Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

Figure 3:
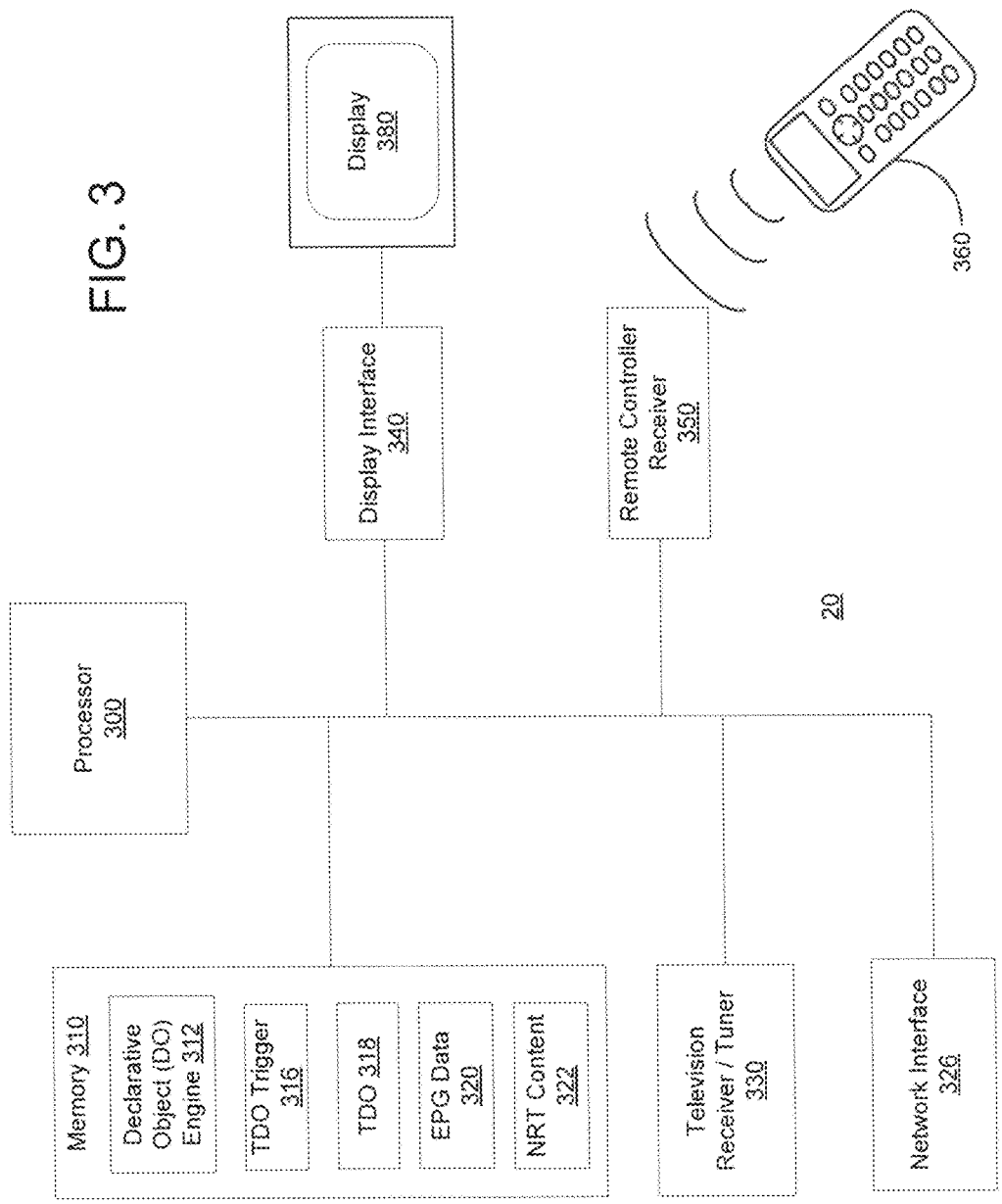
FIG. 3 is a processor-centric block diagram of an exemplary reception apparatus.

A more processor-centric view of the reception apparatus 20 is illustrated in FIG. 3. Storage 230 and memories 240, 242 are depicted collectively as memory 310. Further, at least one processor 300 includes one or more processing units such as CPU 238. Similarly, the various demodulators, decoders, etc., that initially process digital television broadcast signals are collectively depicted as television receiver/tuner 330. The reception apparatus 20 further includes a network interface 326 and a remote controller 360 which communicates with a remote controller receiver interface 350. When the reception apparatus 20 is incorporated in a mobile device, the remote controller 360 and remote controller receiver interface 350 may be replaced with another input interface such as a keypad, touch screen, etc.

Additionally, a display 380 is connected to a display interface 340, which includes for example the uncompressed A/V interface and/or compositor 260, and is either a display integral to the reception apparatus 20 as in a television set or mobile device, or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

Any received TDO triggers 316, TDOs 318, EPG data 320, and/or NRT content 322 can be stored in the memory 310.

In one embodiment, the TDO execution is carried out by a Declarative Object (DO) Engine 312, which is also stored in the memory 310. The TDO, when executed by the DO Engine 312, notifies a user of available NRT content, notifies the user of a service for storing the NRT content in an external device for subsequent access on demand, causes the reception apparatus 20 to retrieve and/or present the NRT content, etc.

Figure 4:
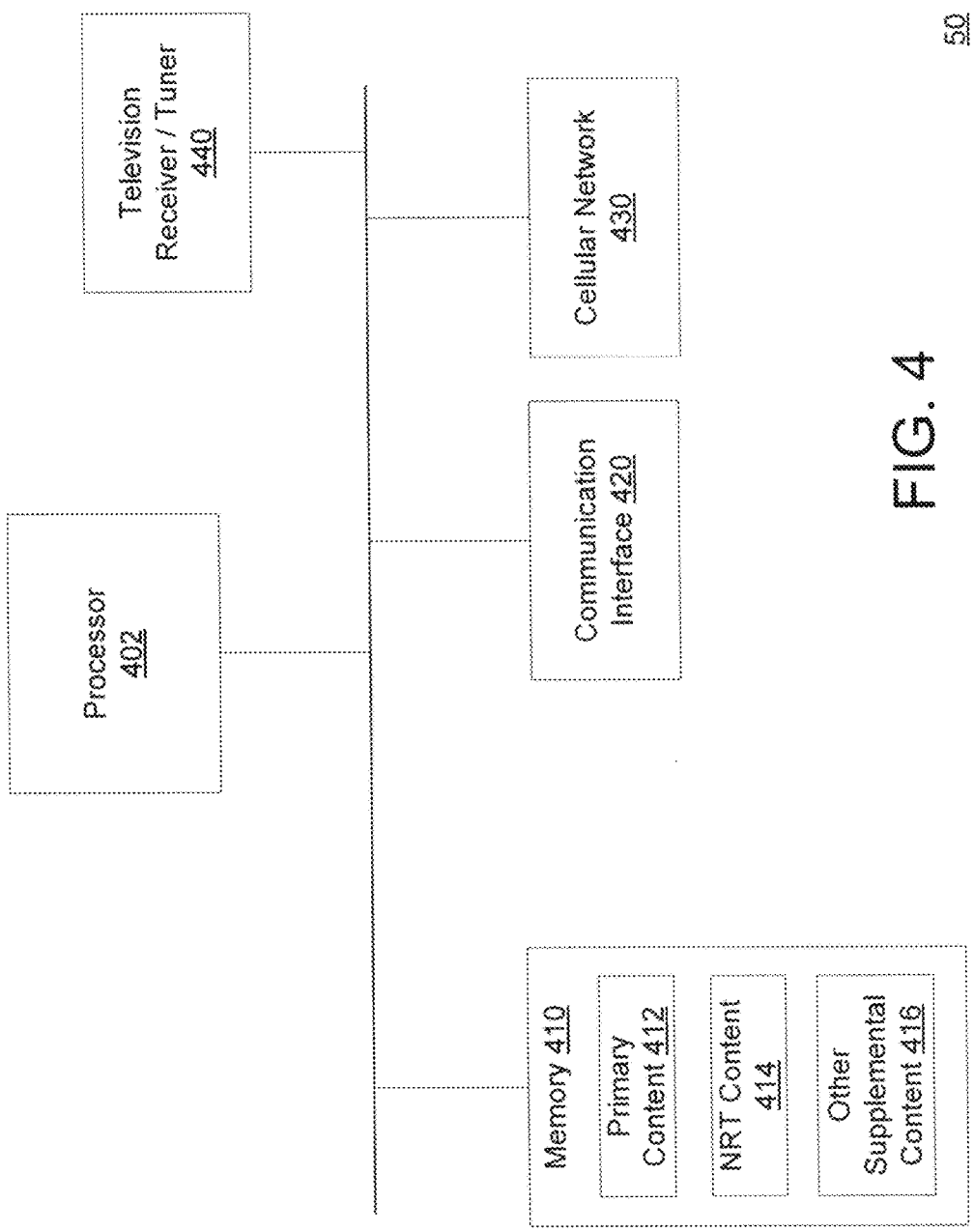
FIG. 4 is a processor-centric block diagram of an exemplary mobile network operator (MNO)

FIG. 4 illustrates an exemplary MNO 50. The MNO 50 includes a processor 402, a memory 410, a communication interface 420, a cellular network 430, and a television receiver/tuner 440.

In one embodiment, the MNO 50 is configured to receive, via the television receiver/tuner 440, a digital television broadcast signal broadcast by a content source 10. The MNO 50 is configured to receive primary and/or NRT content for one or more local areas (i.e., market(s)). The MNO 50, for example via the processor 402, extracts the primary and/or NRT content from the digital television broadcast signal and provides the primary and/or NRT content to a reception apparatus 20 via a cellular network 430.

The MNO 50 is configured to provide the primary content to the reception apparatus 20, for example when the reception apparatus 20 is not capable (e.g., lacking appropriate hardware or signal strength) of receiving the digital television broadcast signal. For example, in one embodiment, the primary and/or NRT content is streamed to or file downloaded by the reception apparatus 20. Further, when the MNO 50 receives primary and/or NRT content from more than one local areas, in one embodiment, the MNO 50 is configured to provide the primary and/or NRT content from a particular local area to the reception apparatus 20 based on one or a combination of predetermined criteria. For example, the MNO 50 may be configured to provide the primary and/or NRT content to the reception apparatus 20 based on a predetermined home market of the reception apparatus 20.

In other embodiments, the MNO 50 is configured to receive the primary and/or NRT content via the Internet, a dedicated transmission from the content source 10, or other sources such as a cable television provider or satellite television provider. When receiving the primary and/or NRT content via the Internet, the primary and/or NRT content may received via streaming or file download using the communication interface 420.

Depending on the embodiment, the MNO 50 provides the primary and/or NRT content via one or a combination of an eMBMS broadcast and a mobile data network service (e.g., LTE). In other embodiments, the MNO 50 is, alternatively or additionally, configured to provide the primary and/or NRT content via the Internet (e.g., via WiFi), or other wireless communication methods (e.g., Bluetooth).

Further, in one embodiment, the MNO 50 is configured to facilitate storage of select NRT content 414, in the memory 410, and subsequent retrieval on demand. In another embodiment, the MNO stores one or more addresses identifying locations (e.g., an external server) at which the select NRT 414 content is stored. In one embodiment, the MNO 50 is further configured to store primary content 412 and/or one or more addresses identifying locations at which the primary content 42 is stored. Other supplemental content 416 provided with the primary and/or NRT content 412, 414 may also be stored in the memory 410.

Figure 5:
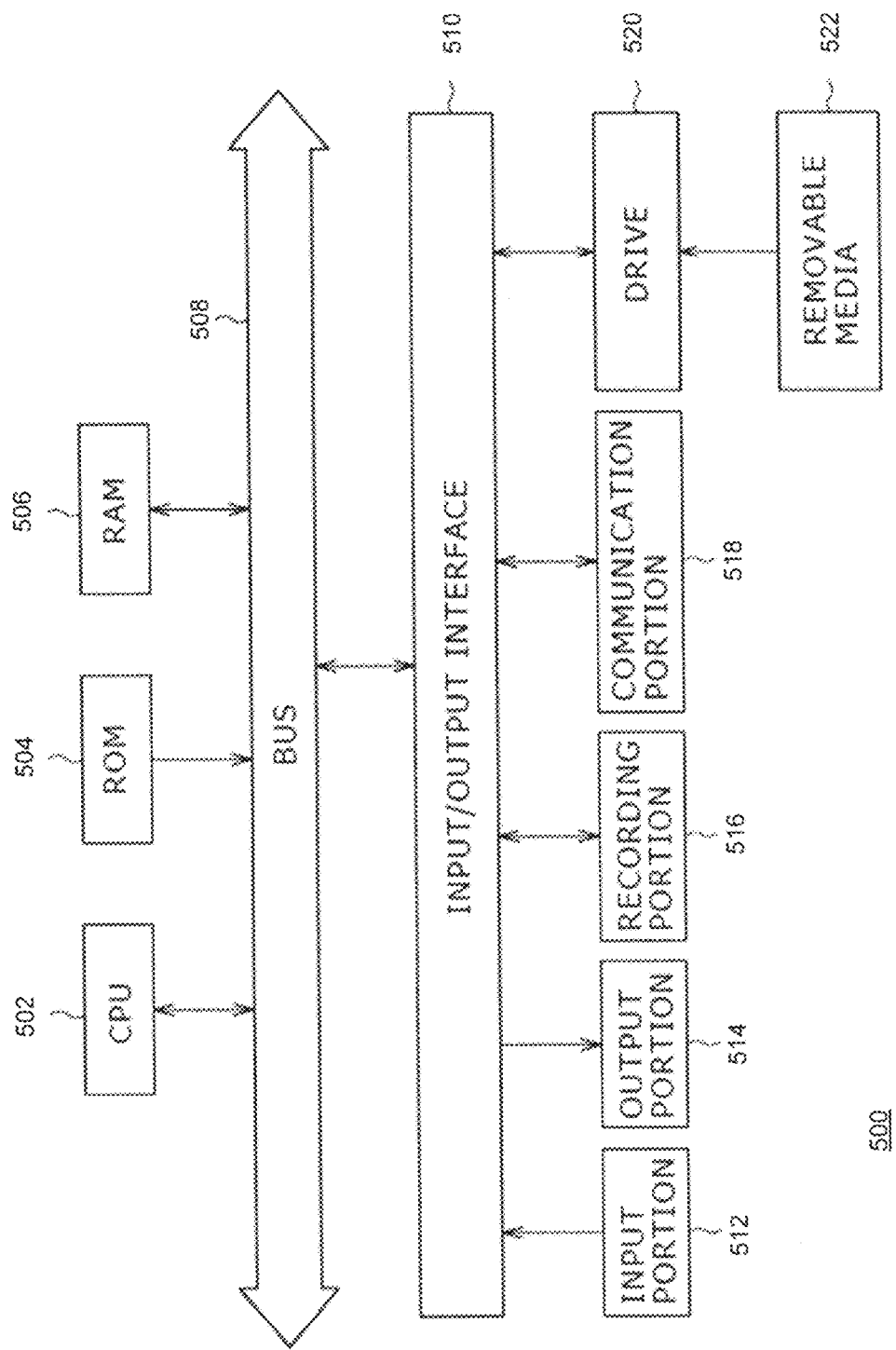
FIG. 5 is an exemplary computer.

FIG. 5 is a block diagram showing an example of a hardware configuration of a computer 500 that can be configured to perform functions of any one or a combination of the content source 10, reception apparatus 20, cloud-based storage system 40, MNO 50, and external storage device.

As illustrated in FIG. 5, the computer 500 includes a central processing unit (CPU) 502, read only memory (ROM) 504, and a random access memory (RAM) 506 interconnected to each other via one or more buses 508. The one or more buses 508 are further connected with an input-output interface 510. The input-output interface 510 is connected with an input portion 512 formed by a keyboard, a mouse, a microphone, remote controller, etc. The input-output interface 510 is also connected to an output portion 514 formed by an audio interface, video interface, display, speaker, etc.; a recording portion 516 formed by a hard disk, a non-volatile memory or other non-transitory computer-readable storage medium; a communication portion 518 formed by a network interface, modem, USB interface, fire wire interface, etc.; and a drive 520 for driving removable media 522 such as a magnetic disk, an optical disk, a magneto-optical disk, a semiconductor memory, etc.

According to one embodiment, the CPU 502 loads a program stored in the recording portion 516 into the RAM 506 via the input-output interface 510 and the bus 508, and then executes a program configured to provide the functionality of the one or combination of the content source 10, reception apparatus 20, cloud-based storage system 40, and MNO 50.

Figure 6:
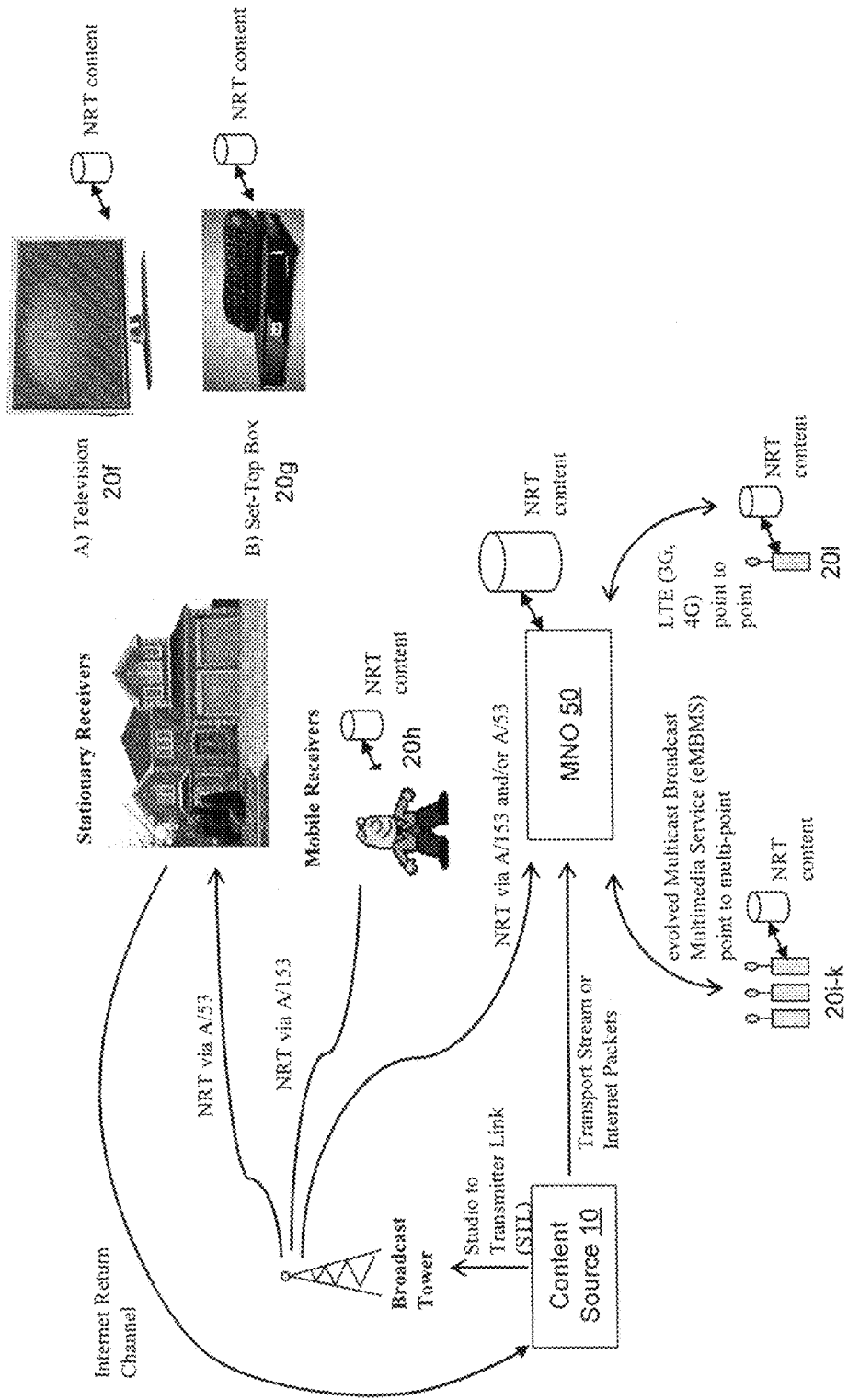
FIG. 6 illustrates an exemplary system for providing NRT content.

FIG. 6 illustrates an exemplary system for providing NRT content included in a digital television broadcast signal to a plurality of different types of reception apparatuses 20*f*-20*l*. The system enables reception apparatuses to share NRT content to allow faster access and/or have smaller memory requirements. As described below, in one embodiment, the NRT content is stored based on user preferences, such as user viewing habits. However, in some cases, new NRT content could be accessed more quickly if another local device already has it stored as opposed to, for example, waiting for a broadcast trickle download.

In one embodiment, the content source 10 provides next generation television services (e.g., ATSC 2.0 services, NRT and Internet connection interfacing) such as one or a combination of auxiliary information, multi-view user interfaces, interactivity and personalization, enhancements to programs due to Internet connectivity, and the NRT content, in addition to traditional television services (e.g., television programs).

Each of the reception apparatuses 20*f*-20*l* is of a stationary (fixed) or mobile receiver type. The reception apparatuses 20*f*-20*l* are configured to receive NRT content included in the digital television broadcast signal by receiving the digital television broadcast signal and downloading, or otherwise retrieving, the NRT content from the digital television broadcast signal.

A return channel may be provided for any of the reception apparatuses 20*f*-20*l*. In one embodiment, the return channel is an Internet return channel that is consistent with the ATSC A/153 standard. Although meant for mobile receivers, such an Internet return channel also applies to stationary receivers which also decode the broadcasted primary and/or NRT content. The Internet return channel allows a broadcaster (e.g., content source 10) to get audience measurements like what is being watched; when. It also provides a path for key delivery to unlock protected content (DRM), billing information, etc.

Figure 14:
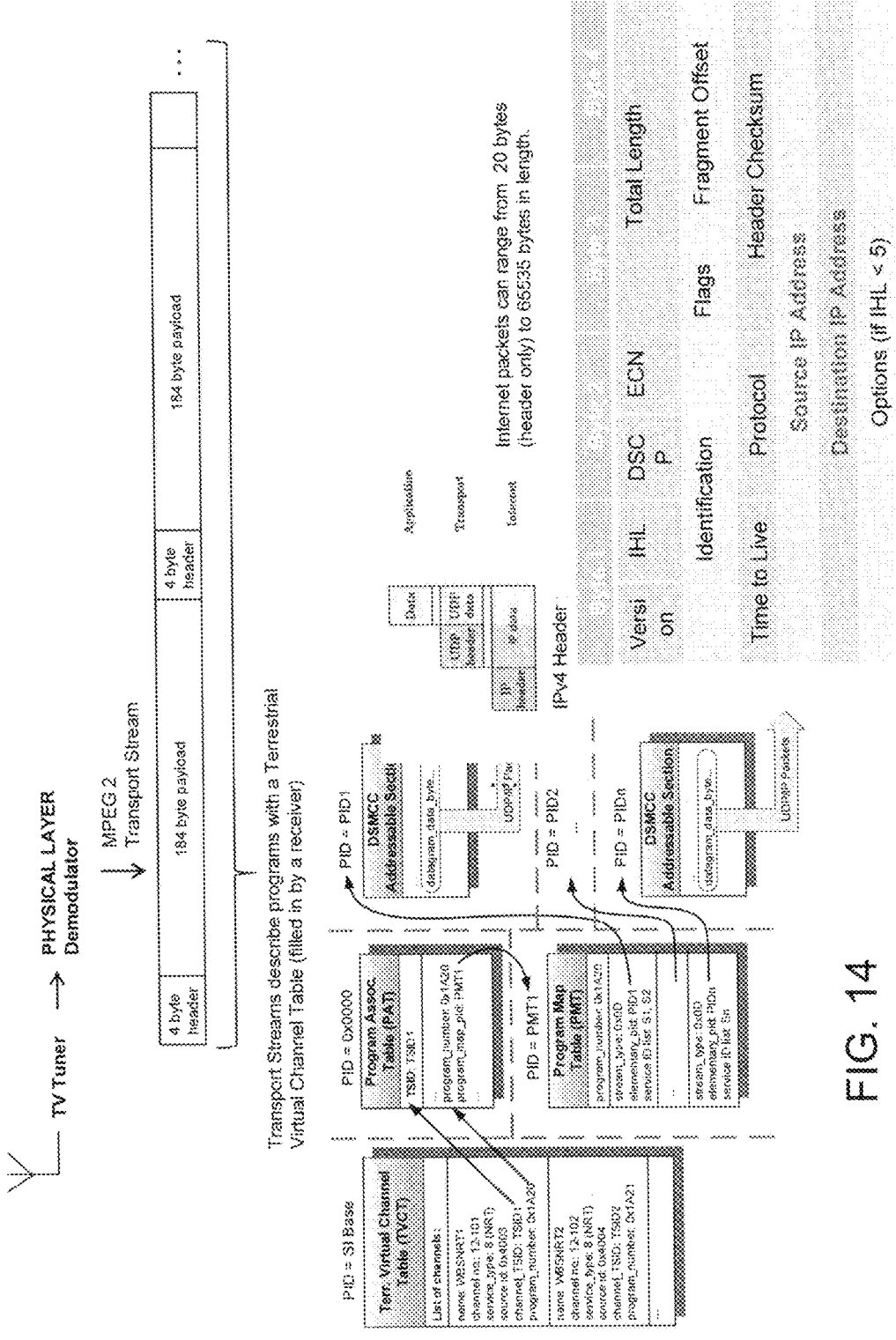
FIG. 14 illustrates an exemplary MPEG-2 Transport Stream (TS)
Figure 16:
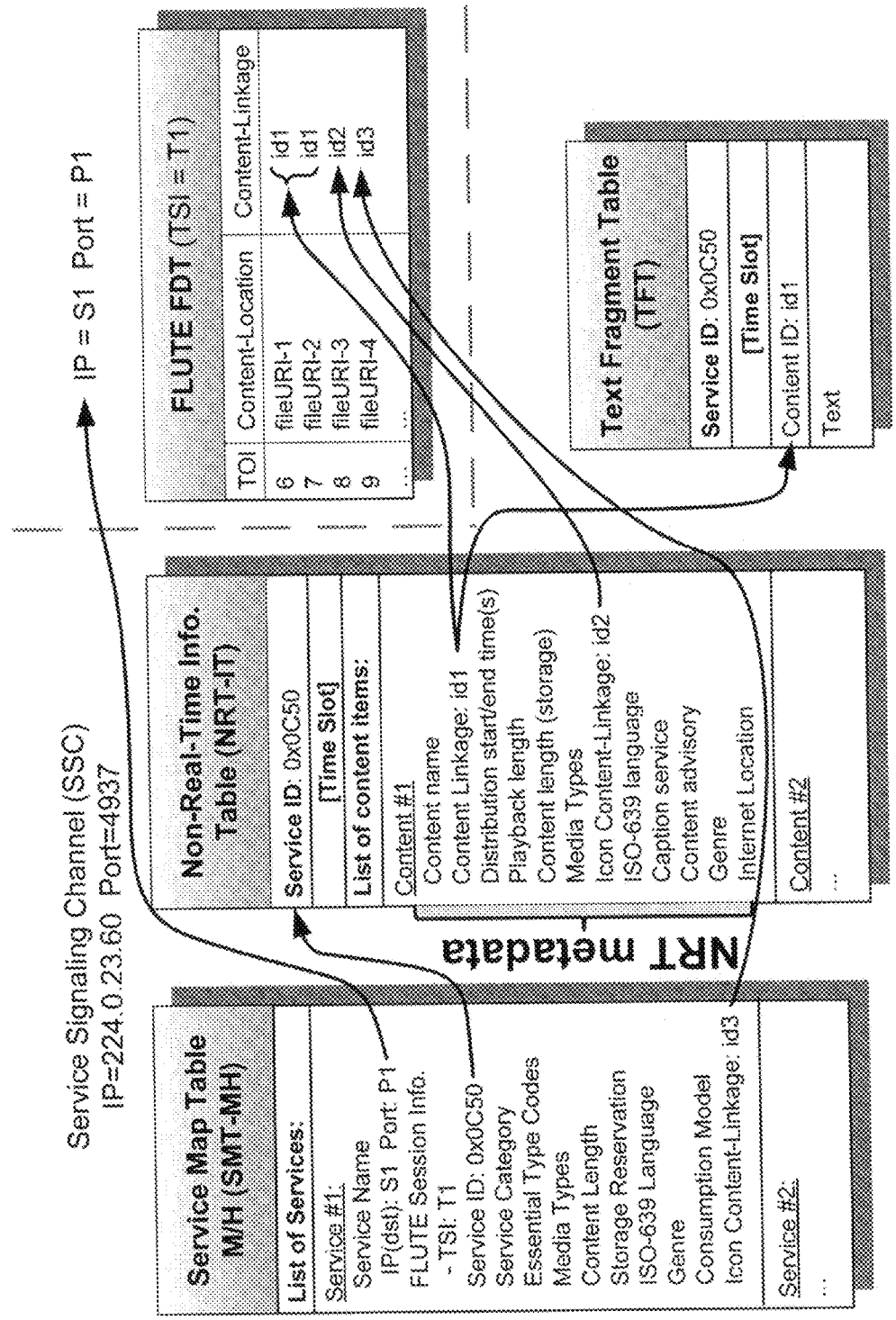
FIG. 16 illustrates an example of information carried in a Service Signal Channel (SSC).

In one embodiment, the reception apparatuses 20*f*, 20*g* receive the NRT content using a FLUTE demultiplexer to separate out IP packet (Digital Storage Media Command and Control (DSMCC)) content, a Service Map Table (SMT), NRT-Information Table (NRT-IT), FLUTE Description Table (FDT) Parser to filter the NRT content, and FDT with NRT Metadata ID to produce the NRT content (MPEG-2 transport/IP video/NRT Metadata/etc.). For example, as illustrated in FIGS. 14-16, a program has an associated Program Identification (PID) value which is used to tie audio/video content together for presentation, or in this case indicate an IP packet encapsulated into an MPEG-2 transport (DSMCC). Inside that IP packet are source/destination IP addresses which show broadcaster/user internet location addresses which go into the SMT. An NRT content description is also included in the packet and a NRT-IT table is filled up with that information which can point to the URL locations of FLUTE supplied NRT Metadata (FDT).

The reception apparatuses 20*i*-20*l* are configured to receive the NRT content included in the digital television broadcast signal via an MNO 50, or other intermediary system that is configured to provide the NRT content included in the digital television broadcast signal to the reception apparatuses 20*i*-20*l*.

The MNO 50 is configured to receive the digital television broadcast signal and download, or otherwise retrieve, the NRT content, or receive a Transport Stream (TS) or Internet packets including the NRT content from the content source 10 (e.g., a broadcaster) via another communication means such as a direct link or the Internet. In one embodiment, the MNO 50 is configured to store one or a combination of a SMT, NRT-IT, FDT (NRT metadata), store NRT content, open ports for NRT content capture/interactive communication. In another embodiment, the MNO could put the burden on the reception apparatus 20 and pass along the NRT-IT, FLUTE FDT, NRT data descriptions/content to the reception apparatus 20 to store the data. As described above, each program has an associated PID value which is used to tie audio/video content together for presentation, or in this case indicate an IP packet encapsulated into an MPEG-2 transport (DSMCC). The MNO 50 can decide whether to pass on the IP packets to receivers (e.g., reception apparatuses 20*i*-20*k*) or decode them and store the information (e.g., FMT, NRT-IT, etc.) which can be referenced by the receivers. Each MNO can decide on how much control they want. Inside the IP packet are source/destination IP addresses which show broadcaster/user internet location addresses which go into the SMT. NRT content description is also included in the packet and a NRT-IT table is filled up with that information which can point to the URL locations of FLUTE supplied NRT Metadata (FDT).

In one embodiment, any of the reception apparatuses 20*f*-20*l* have three ways to get NRT content. One is the content source 10 (e.g., the broadcaster) forces the NRT content to be stored on the respective reception apparatus (PUSH) which the user can browse through later. Another is to send a table of contents as it were for the user to browse through and download content of interest (BROWSE and DOWNLOAD). Or a Portal can be opened which the user can use to download NRT data stored at the content source 10 (PORTAL).

The content source 10 may be configured to broadcast the primary and/or NRT content in accordance with any one or a combination of the ATSC A/53, A/103, and A/153 Standards.

Figure 7:
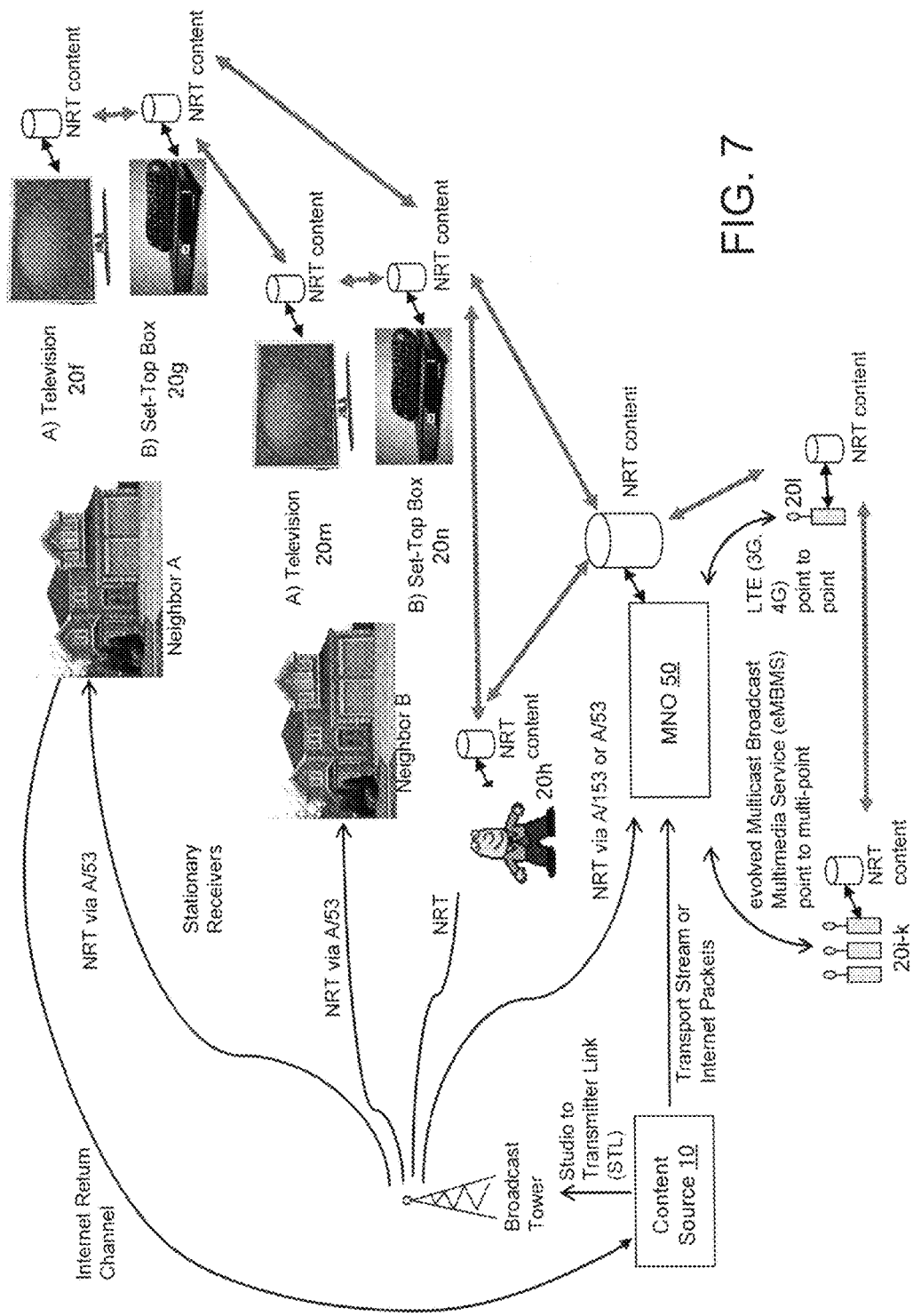
FIG. 7 illustrates another example of a system for providing NRT content.

FIG. 7 illustrates another example of a system for providing NRT content included in a digital television broadcast signal to a plurality of different types of reception apparatuses 20*f*-20*n*. Since the NRT content can be stored by any combination of the plurality of reception apparatuses 20*f*-20*n* that are part of one or more subnets of addresses, storage across one or a combination of the plurality of reception apparatuses 20*f*-20*n* is utilized to retrieve the NRT content. Therefore, instead of limiting the NRT content to one location (e.g., the digital television broadcast signal), it is distributed across a plurality of locations.

In one embodiment, one or more of the reception apparatuses 20*f*-20*n* automatically downloads NRT content based on user preferences (e.g., user viewing habits, specific request, etc.). For example, the reception apparatus 20*f* automatically downloads the NRT content associated with a predetermined number of most frequently viewed television channels, favorite television programs, viewing times, etc. When the NRT content is not automatically downloaded and is to be presented to the user (e.g., in response to a user request), in one embodiment, the reception apparatus 20*f* trickle downloads the NRT content from a digital television signal broadcast carrying the NRT content.

However, in some cases, the NRT content can be downloaded from another reception apparatus (or other external device) in a shorter period of time. Accordingly, the reception apparatus 20*f* is configured to determine whether the NRT content can be downloaded from another reception apparatus that is accessible to the reception apparatus 20*f* and to download the selected NRT content from the other reception apparatus, if possible. In another embodiment, the reception apparatus 20*f* estimates the times required to trickle download the NRT content from the broadcast and another reception apparatus, and downloads the NRT content from the one of the broadcast or the other reception apparatus based on the shortest estimated download time.

Accordingly, when a reception apparatus 20*f* determines that selected NRT content is not stored locally, the reception apparatus 20*f* is configured to communicate with other reception apparatuses (e.g., reception apparatus 20*g*) to determine whether the NRT content can be downloaded from the other reception apparatus. Depending on the embodiment, the reception apparatus 20*f* may be limited to communicating only with other reception apparatuses associated with the same user, household, community, service provider, subnet, etc.

For example, when a user of a reception apparatus 20*f* wants to watch a movie which has already been downloaded by another reception apparatus (e.g., a neighbor's reception apparatus 20*m*), the reception apparatus 20*f* downloads, or retrieves via other methods such as streaming, the movie from the other reception apparatus 20*m*.

The download of NRT content from another reception apparatus or the broadcast also applies to mobile devices, such as smartphones that communicate with the MNO, although storage capacity in mobile devices can be limited. In one embodiment, the mobile devices (e.g., reception apparatuses 20*i*-20*l*) access the primary and/or NRT content from a common external storage area (e.g., a predetermined external device) which is known by the MNO 50 or the mobile devices themselves.

Figure 8:
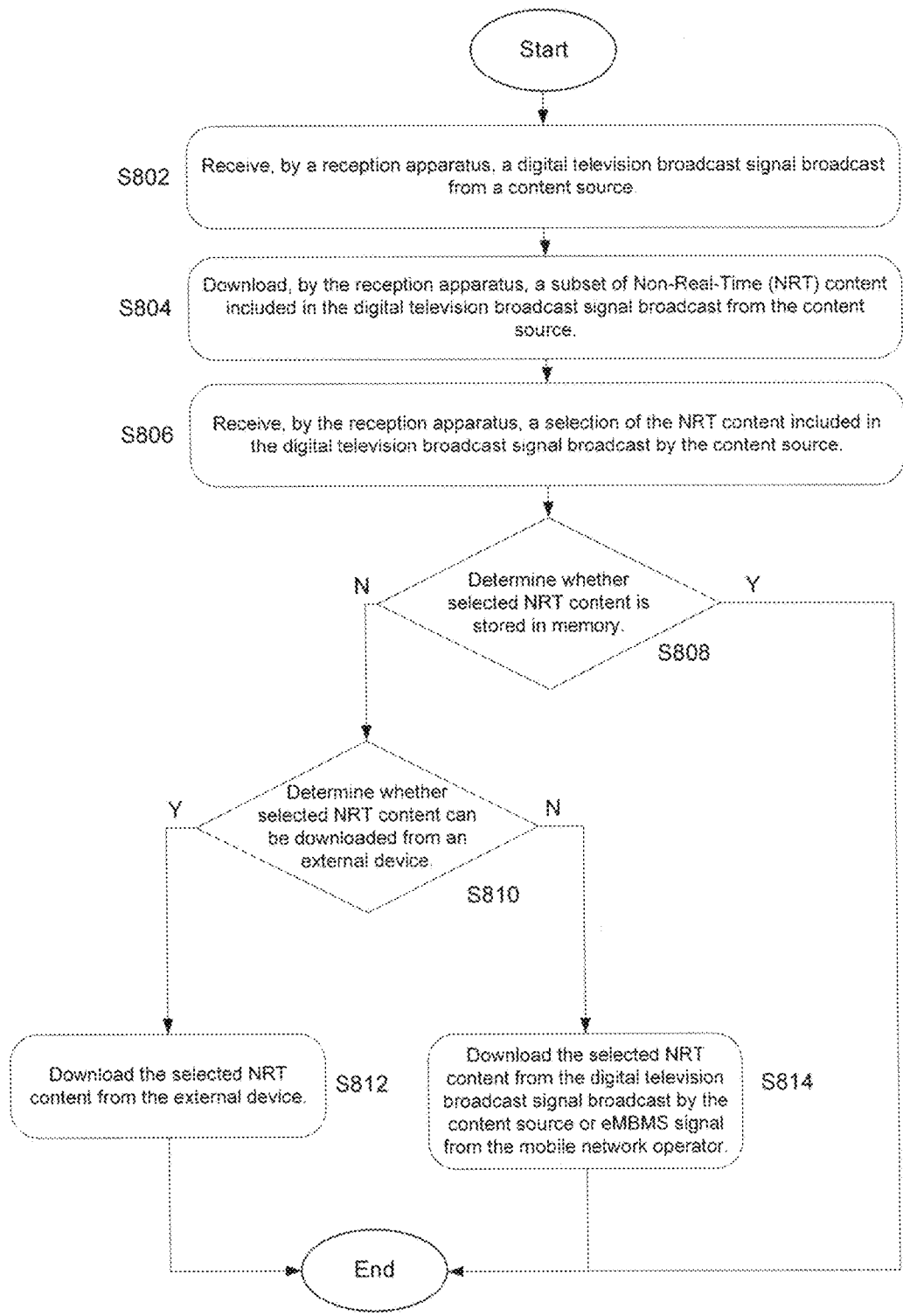
FIG. 8 illustrates a flow diagram of an exemplary method for accessing NRT content.

FIG. 8 is a flow diagram of an exemplary method of a reception apparatus 20 to access NRT content. In step S802, when the reception apparatus 20 is equipped with a digital television broadcast receiver, the reception apparatus 20 receives a digital television broadcast signal broadcast from a content source 10. In step S804, the reception apparatus 20 downloads a subset, or all, of the NRT content included in the digital television broadcast signal broadcast from the content source 10. In one embodiment, the reception apparatus 20 is configured to receive digital television broadcast signals from a plurality of content sources and to download a subset of the NRT content included in one or a combination of the digital television broadcast signals.

In another embodiment, when the reception apparatus 20 is not equipped with a digital television broadcast receiver, the reception apparatus 20 is configured to receive the NRT content from an eMBMS signal broadcast from the MNO 50. In one embodiment, the eMBMS signal is allocated one carrier within an orthogonal frequency division multiplexing (OFDM) signal to be received by a plurality of mobile devices (e.g., reception apparatuses 20*i*-20*k*). Further, in one embodiment the eMBMS signal includes the same information (e.g., same IP packets) included in the digital television broadcast signal, such as the primary and/or NRT content. In another embodiment, the eMBMS signal only includes the primary content. In this embodiment, the reception apparatus 20 receives an eMBMS signal in step S802 and optionally downloads the subset of NRT content included in the eMBMS signal in step S804.

In step S806, the reception apparatus 20 receives a selection of the NRT content included in the digital television broadcast signal broadcast by the content source 10. The reception apparatus 20 receives the selection from a user or determines the NRT selection automatically using predetermined criteria. For example, the reception apparatus may be configured to determine the selection based on any one or a combination of user preference information and information included in the digital television broadcast signal (e.g., a trigger or TDO).

In step S808, the reception apparatus 20 determines whether the selected NRT content is stored locally in memory, or at a predetermined location. The reception apparatus 20 determines whether the selected NRT content is stored locally using, for example, an NRT identifier associated with the selected NRT content. The NRT identifier uniquely identifies associated NRT content. In one embodiment, the NRT identifier is acquired from a Service Signaling Channel (SSC) included in the digital television broadcast signal. In one embodiment, the NRT identifier is service identifier included in the SSC or other identifying information included in an NRT Information Table (NRT-IT) extracted from the SSC. Other embodiments of the NRT identifier are illustrated in FIG. 16 and include the service ID (which points to the NRT-IT), an Icon Content-Linkage which directly points to FLUTE description table content showing content addresses, and/or NRT metadata which can be filtered out.

When the selected NRT content is determined to be stored locally in step S808, the reception apparatus 20 performs no further action with respect to the selected NRT content until presentation or other action (e.g., remote storage) is requested. However, when the reception apparatus 20 determines in step S808 that the NRT content is not stored in memory, the reception apparatus 20 proceeds to step S810.

In step S810, the reception apparatus 20 determines whether the selected NRT content can be downloaded from an external device (e.g., another reception apparatus or other consumer electronics device) that is accessible to the reception apparatus 20 via one or more communication networks. An example of this determination is described below with respect to FIG. 10.

When the selected NRT content is determined to be downloadable from an external device, the reception apparatus 20 downloads, or otherwise retrieves, the selected NRT content from the external device in step S812. In one embodiment, the selected NRT content may be streamed from the external device. In another embodiment, one or more NRT content files are downloaded from the external device When the selected NRT content is determined not to be downloadable from an external device, the reception apparatus 20 trickle downloads the selected NRT content from the digital television broadcast signal broadcast by the content source 10 or the eMBMS signal broadcast by the MNO 50.

Figure 9:
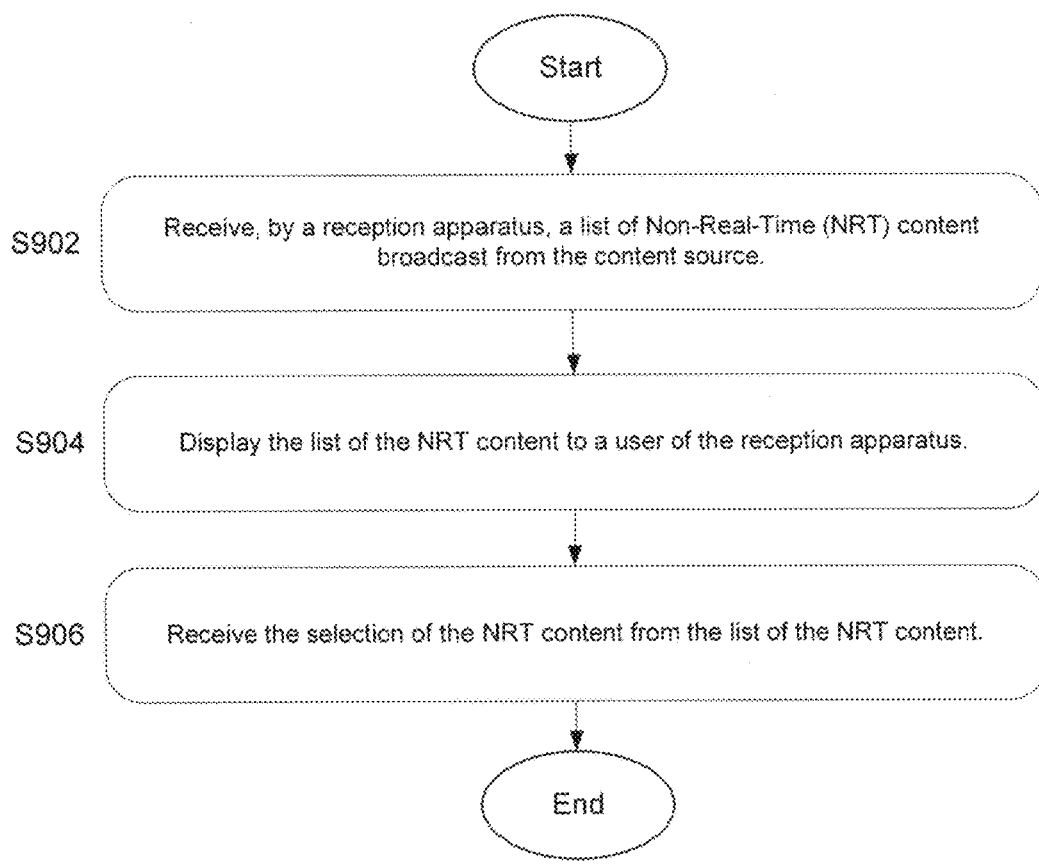
FIG. 9 illustrates a flow diagram of an exemplary method for NRT content selection.

FIG. 9 illustrates a flow diagram of an exemplary method for selection of NRT content. In step S902, the reception apparatus 20 receives a list of NRT content broadcast from the content source 10. In one embodiment, the list of NRT content is extracted from the SSC of a digital television broadcast signal. In another embodiment, the list of NRT content is provided as supplemental information in association with primary content. For example, the list of NRT content may be provided by a TDO.

The list of the NRT content is displayed to a user of the reception apparatus 20 in step S904. The user navigates through the list to select NRT content of interest. When the user makes a selection from the list of NRT content, the reception apparatus 20 receives the selection of the NRT content in step S906. In other embodiments, the reception apparatus 20 performs the NRT content selection.

Figure 10:
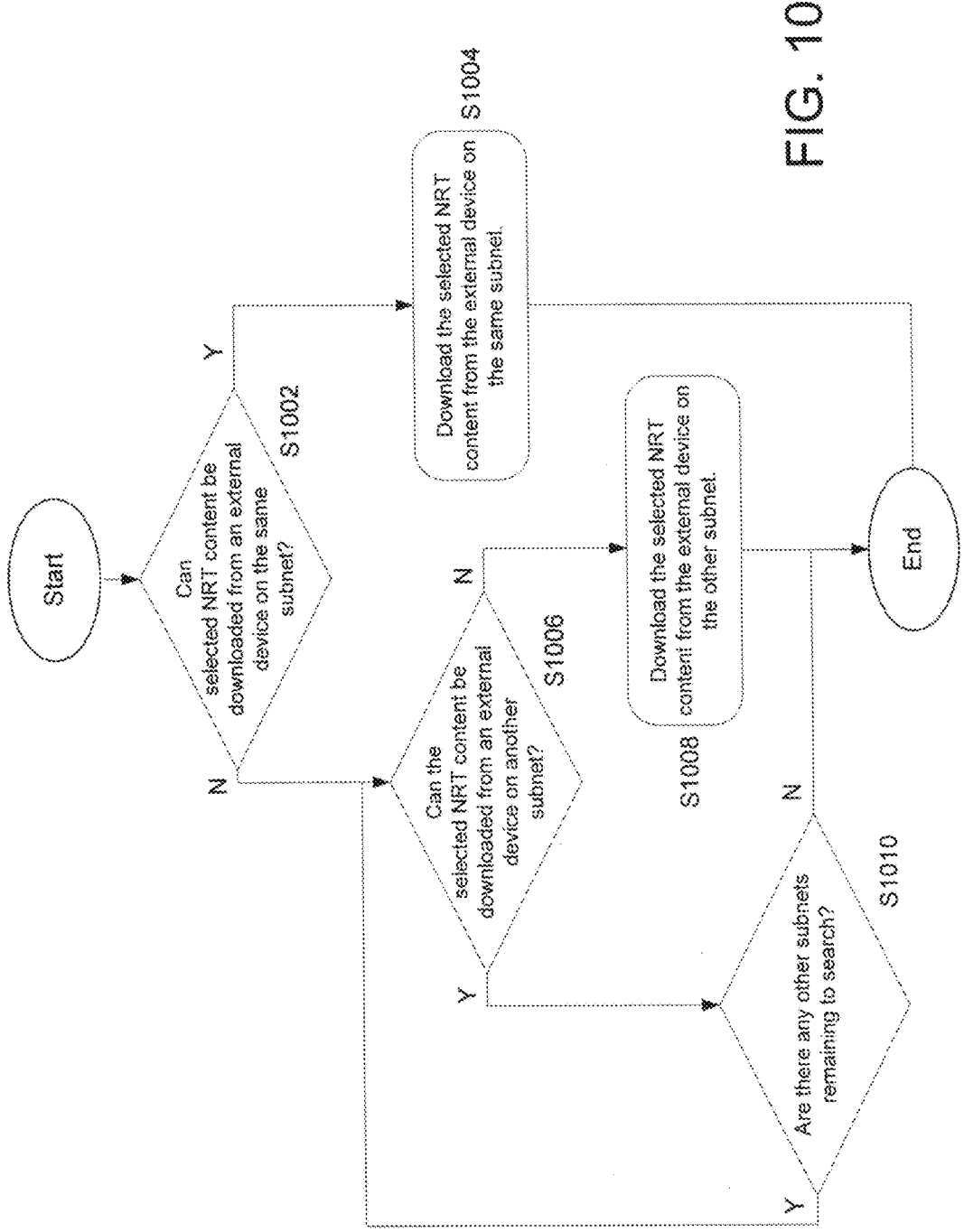
FIG. 10 illustrates a flow diagram of an exemplary method for determining whether NRT content is downloadable from an external device.

FIG. 10 illustrates a flow diagram of an exemplary method of a reception apparatus 20 for determining whether NRT content can be downloaded, or otherwise retrieved, from an external device. As illustrated in FIG. 10, in step S1002, the reception apparatus 20 determines whether selected NRT content can be downloaded from an external device connected to the same subnet as the reception apparatus 20. When the reception apparatus 20 determines that the selected NRT content can be downloaded from an external device on the same subnet, in step S1004, the reception apparatus proceeds to download, or otherwise retrieve, the selected NRT content from the external device.

In step S1006, the reception apparatus 20 determines whether the selected NRT content can be downloaded from an external device on another subnet when the selected NRT content is determined not to be downloadable from an external device on the same subnet. When downloadable, the reception apparatus 20 proceeds to step S1008 and downloads, or otherwise retrieves, the selected NRT content from the external device on the other subnet. When the NRT content is determined not to be downloadable from the other subnet, in step S1010, the reception apparatus 20 determines if there are any remaining subnets to search. The reception apparatus 20 returns to step S1006 if there is another subnet to search, otherwise the reception apparatus 20 terminates the determination process.

For example, a search engine in the reception apparatus 20 may be configured to start with a user's network prefix and only search for host devices within that prefix. If a host device containing the NRT content is not found, the search engine opens up the next closest network prefix and so on in a search for the NRT content. For example, as illustrated in FIG. 15, for IPv4, there are 4 byte addresses. The search engine will keep the MSB byte and 2 middle bytes the same and start altering the LSB byte address in a search for NRT content. This LSB byte address keeps the internet search close to the user's location. Then the search can expand up into the upper bytes.

In one embodiment, each network prefix would look for the SSC (stored locally with the IP address, for example, 224.0.23.60) and quickly learn of NRT content availability. The search could be binary based or based on other methods to find the NRT content quickly. That IP address has NRT-IT information which houses content addresses. Either work from the users' IP address or this one or follow the NRT-IT tables of other close devices (e.g., reception apparatuses) to search for content.

In one embodiment, the search engine is configured to follow NRT-IT information stored on other peoples' devices. (Keep a record of the stored table of content addresses).

In one embodiment, the FLUTE FDT is formatted in a way for quick IP address selection. For example, the search engine filters for a predetermined field illustrated in FIG. 16. In one embodiment, the search engine filters for id3 (Icon Content-Linkage) which is housed in the SMT-MH table directly to speed up the search process.

Once a content location is known, a reception apparatus 20 is configured to ask for the content (IP protocol) at the source (known content location) from the user (receiver internet address). IP protocol is followed to retrieve the information.

In one embodiment, when the NRT content is determined to be downloadable from a plurality of external devices, the reception apparatus 20 selects one of the plurality of external devices based on a one or a combination criteria such as connection speed, priority information, etc.

As described above, one or more subnets for NRT can be expanded to include external devices. This is subject to personal firewalls and user preferences being open to allow devices to search for NRT content. Further, in one embodiment, when the NRT content is simply referred to by an IP address, then it is open to the Internet space where the NRT content can be retained.

Figure 11:
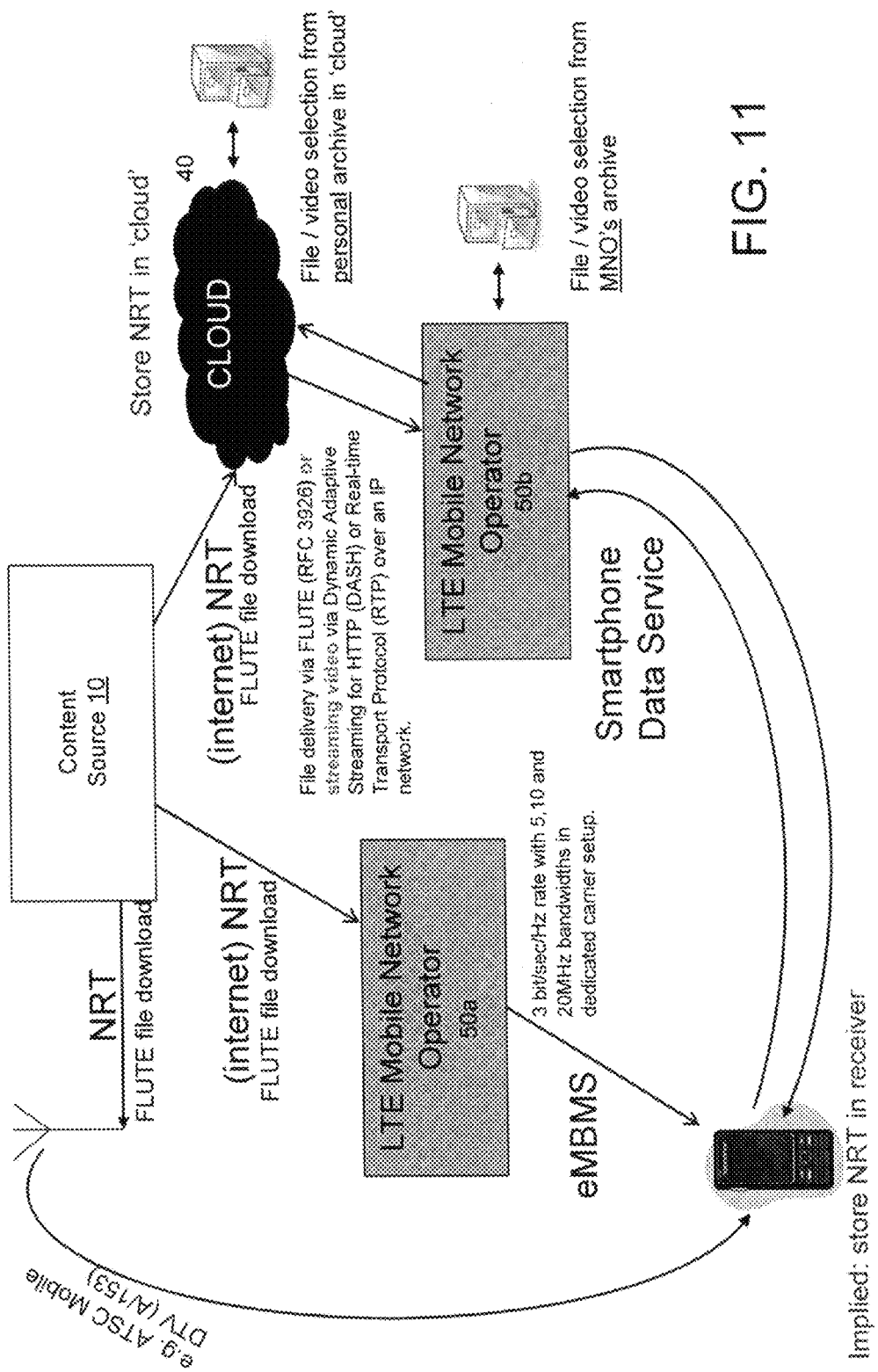
FIG. 11 illustrates an exemplary system for storing NRT content.

FIG. 11 illustrates an exemplary system for storing NRT content for subsequent access. In one embodiment, the NRT content is stored such that it is accessible on demand. In other embodiments, the NRT content may be forwarded to another user or designated destination.

FIG. 11 illustrates an embodiment in which the reception apparatus 20 is a mobile device. However, the storing of NRT content is equally applicable to fixed devices configured to receive content in a digital television broadcast signal. For example, while watching NRT content on a mobile device, through eMBMS or ATSC Mobile DTV (e.g., ATSC A/153), a user is able to store the NRT content in an external device (e.g., cloud-based storage system 40) for future viewing and avoid locally storing the NRT content on the reception apparatus 20, which is likely to have limited memory.

In one embodiment, the NRT content includes next generation television services (e.g., ATSC 2.0 services), as described above. The ATSC 2.0 NRT specification, ATSC A/103 calls for data to be stored. Local storage of NRT content is possible if the NRT content is small or if the reception apparatus 20 can support a fair amount of memory. However, when the reception apparatus 20 is, for example, a mobile device, memory may be a critical element and costly. In this case, local storage of NRT content may not be possible.

A content source 10 provides the NRT content, via broadcast or the Internet, to one or a combination of a reception apparatus 20, LTE MNO 50a, and cloud-based storage system 40. In one embodiment, the NRT content provided over the Internet is delivered using the File Delivery over Unidirectional Transport protocol. The reception apparatus 20 is configured to receive the NRT content via one or a combination a digital television broadcast signal (e.g., ATSC A/153 Mobile DTV signal), an eMBMS signal broadcast from the LTE MNO 50a, and a data service (e.g., smart phone data service) provided by an MNO 50b. However, any one or a combination of MNOs can be configured to provide the eMBMS broadcast and smartphone data services.

The reception apparatus 20 is configured to store the NRT content for subsequent access via the data service provided by the MNO 50b. In response to receiving a request to store the NRT content in an external device (e.g., the cloud-based storage system 40), the reception apparatus 20 is configured to send an instruction to store the NRT content in the external device via the data service. Depending on the embodiment, the reception apparatus 20 may or may not send the NRT content itself to the external device.

For example, when the NRT content is stored in the reception apparatus 20, the reception apparatus 20 is configured to provide the NRT content to the external device for storage. In another example, when the external device (e.g., the cloud-based storage device 40) is configured to receive the NRT content from the content source 10, the reception apparatus 20 may simply notify the external device as to which NRT content to store. Alternatively, when the MNO 50b is configured to receive the NRT content from the content source 10, in one embodiment, the reception apparatus 20 instructs the MNO 50b to forward the NRT content to the cloud-based storage system 40. Although illustrated separately, in one embodiment, the cloud-based storage system 40 may be incorporated into the MNO 50b or any other device (e.g., another reception apparatus 20, a consumer electronics device, etc.) The external device may be any networked device that is capable of storing the NRT content.

In one embodiment, the reception apparatus 20, or other consumer electronics device, accesses the stored NRT content files using file delivery via FLUTE as defined for example in RFC 3926, which is incorporated herein by reference in its entirety. In other embodiments, the NRT content is streamed via Dynamic Adaptive Streaming for HTTP (DASH) or Real-time Transport Protocol (RTP) over an IP network.

Figure 12:
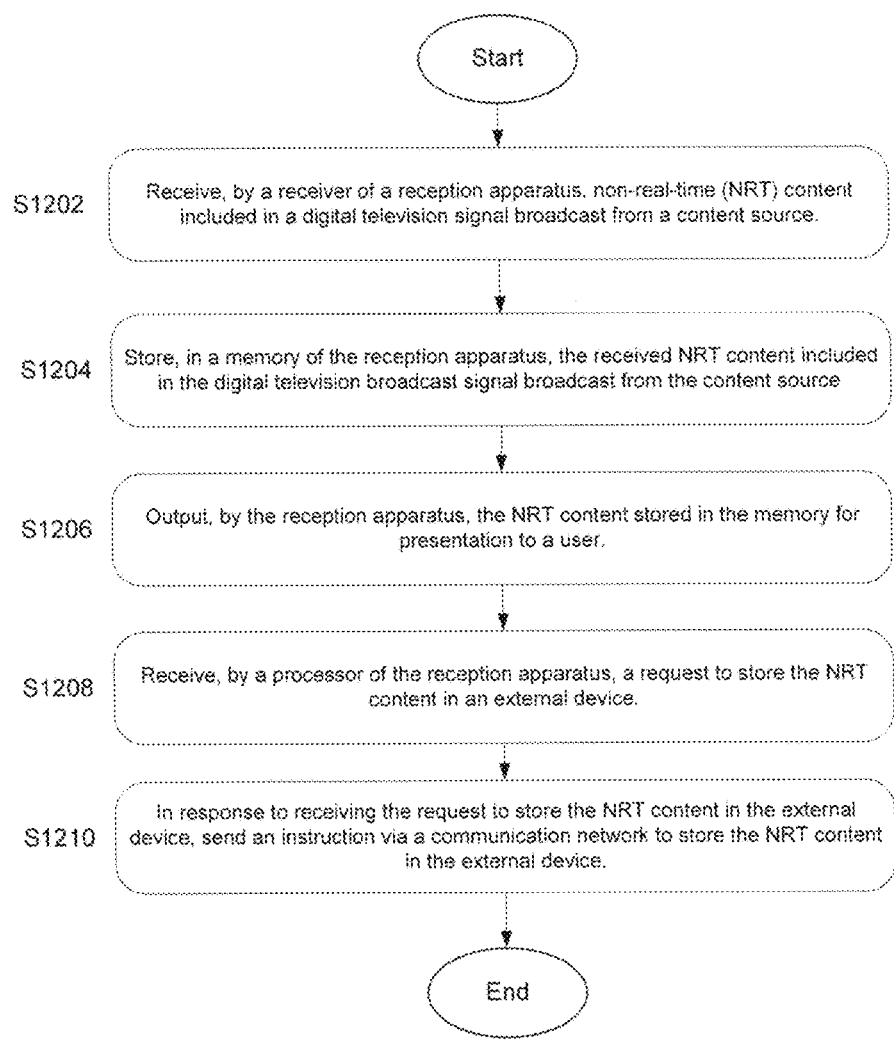
FIG. 12 illustrates a flow diagram of an exemplary method for storing NRT content in an external device.

FIG. 12 is a flow diagram of an exemplary method of a reception apparatus 20 for storing NRT content in an external device for subsequent access on demand. In step S1202, the reception apparatus 20 receives NRT content included in a digital television broadcast signal broadcast from a content source 10. The reception apparatus 20 receives the NRT content by receiving the digital television broadcast signal, an EMBMS broadcast from an MNO 50, or data from an intermediary system.

In step S1204, the reception apparatus 20 stores the received NRT content in a memory of the reception apparatus 20. In one embodiment, the reception apparatus 20 determines whether the storage capacity of the memory of the reception apparatus 20 is sufficient to store the NRT content prior to storing the received NRT content in the memory, as illustrated in FIG. 13.

Figure 13:
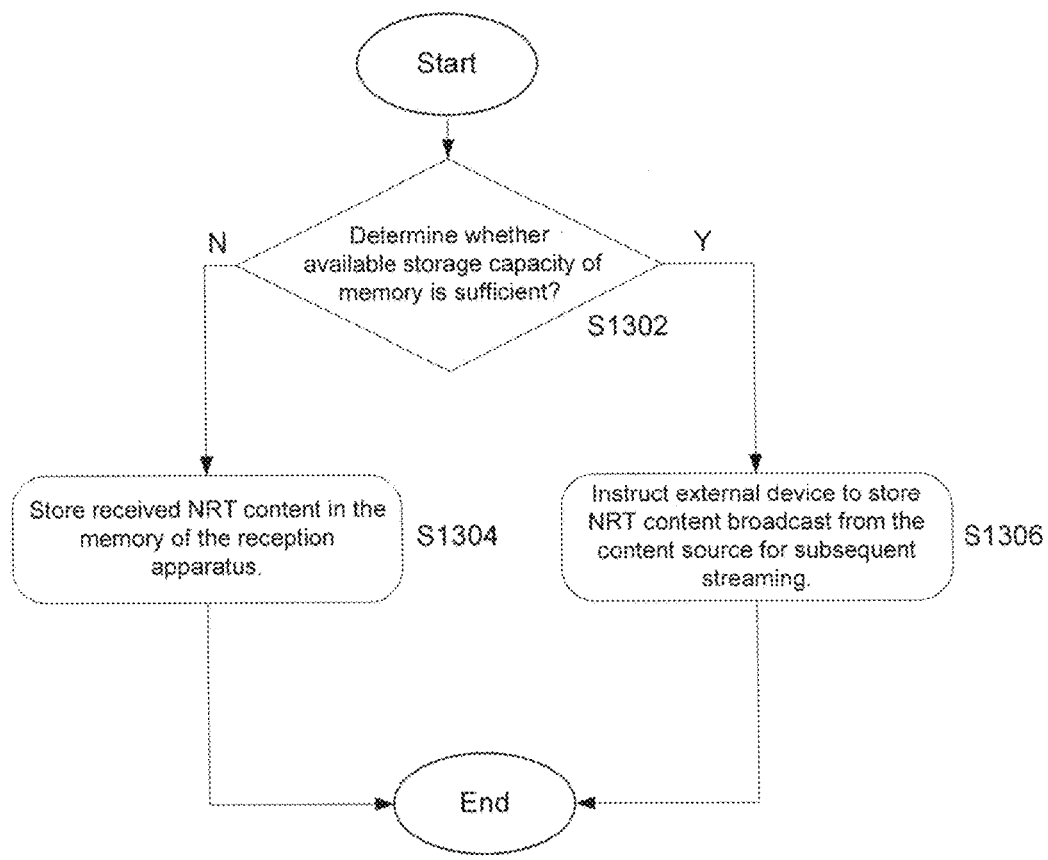
FIG. 13 illustrates a flow diagram of an exemplary method for determining whether the NRT content can be stored locally.

As illustrated in FIG. 13, the reception apparatus 20 determines whether the storage capacity of the memory of the reception apparatus 20 is sufficient in step S1302. When the storage capacity of the memory is determined to be sufficient, in step S1304, the reception apparatus 20 stores the received NRT content in the memory of the reception apparatus 20. However, when the storage capacity of the memory is determined to be insufficient, in step S1306 the reception apparatus 20 instructs an external device (e.g., the cloud-based storage system 40), either directly or through an intermediary system, to store the NRT content broadcast from the content source for subsequent streaming to the reception apparatus 20 or another device. As described above, the NRT content can be streamed via, for example, DASH or RTP over an IP network.

In step S1206, the reception apparatus 20 outputs the NRT content stored in the memory for presentation to a user of the reception apparatus 20. In one embodiment, the NRT content is presented during an associated primary content broadcast. Depending on the embodiment, the NRT content is presented in response to a request from the user or according to a predetermined schedule set by, for example, the NRT content provider.

In other embodiments, the reception apparatus 20 skips steps S1204 and S1206. For example, the reception apparatus 20 skips step S1204 when the external device can receive the NRT content from a source different from the reception apparatus 20. Further, the reception apparatus 20, in one embodiment, skips step S1206 upon receipt of a request to store the NRT content for presentation at a later date.

In step S1208, the reception apparatus 20 receives a request to store the NRT content in the external device. The external device may be selected from a list of available devices, designated by user at the time of the request, or predetermined. For example, a user of the reception apparatus 20 may have previously registered a cloud-based storage account to which the NRT content is to be stored. However, as described above, the NRT content may be stored in any networked external device (e.g., content source 10, another reception apparatus 20, MNO 50, etc.)

In response to receiving the request to store the NRT content in the external device, in step S1210, the reception apparatus 20 sends an instruction via a communication network (e.g., the Internet, a cellular network, a home network, etc.) to store the NRT content in the external device. Depending on the embodiment, the reception apparatus 20 may or may not send the NRT content concurrently with or after the request. For example, when the NRT content is stored in the memory of the reception apparatus 20, the reception apparatus 20 sends the NRT content along with any necessary account information to store the NRT content in the external device. In other embodiments, the reception apparatus 20 instructs an intermediary system to send the NRT content to the external device or instructs the external device to download, or otherwise retrieve, the NRT content. For example, the external device may be configured to receive the digital television broadcast signal and to download selected NRT content from the digital television broadcast signal.

In one embodiment, content can be stored in a local home computer that streams the NRT content (e.g., large movie size files) to the reception apparatus 20 or another designated device (e.g., a big screen television).

Further, in one embodiment, the reception apparatus 20 determines whether the external device has sufficient memory to store the NRT content prior to sending the storage request or the NRT content. For example, the reception apparatus 20 may request the available storage space from one or more external devices and either automatically select an appropriate external device or display the storage options to a user of the reception apparatus 20. Further, the user may register a new external device or storage account to store the NRT content.

FIG. 14 illustrates an exemplary MPEG-2 TS. Primary content included in the MPEG-2 TS are described with a Terrestrial Virtual Channel Table (TVCT), which is generated by the reception apparatus 20. The sub-channels, in the TVCT, from a broadcaster (8.1, 8.2, 8.3 for example) are filled in by the reception apparatus 20. The channel listing (e.g., 5.1, 8.1, 8.2, 8.3, 10.1, 12.1, 12.2, 15.1) is this TVCT. It is generated by each reception apparatus 20 (e.g., TV receiver). The reception apparatus 20 fills this table in when it does a scan of the spectrum to find broadcast channels. The MPEG-2 TS includes Program Association Tables that list all primary content available in the MPEG-2 TS. Each primary content in the PAT has an associated PID for its PMT. The PMT provides information such as a program number and lists of elementary streams that comprise the program. Each program within a channel is described by a PMT which has a unique PID. Elementary streams associated with that program have PIDs listed in that PMT and the reception apparatus 20 only has to decode the payload of certain PIDs to receive all content for a program. Further, as illustrated in FIG. 14, some data in the PID could have a DSMCC description which contains datagram data bytes for NRT content.

In one embodiment, NRT content and metadata, for example as outlined in FIG. 16 (under Content #1), are tunneled into MPEG-2 transport streams via the use of, for example, ATSC A/90 and A/92 standards, which provide a way to package IP packets into an MPEG-2 TS. Examples of metadata include secondary audio channels, emergency service alerts, further information from the program, etc. The NRT content is described via the use of tables which are located at a certain IP address (e.g., 224.0.23.60) on port 4937, which is referred to as an SSC. This address is registered with the Internet Assigned Numbers Authority so it is accessible from any device. The SSC contains a SMT, NRT-IT and Text Fragment Table (TFT), as illustrated in FIG. 16, to describe the NRT content and where it is located. The NRT-IT contains NRT metadata which (one piece) has content linkage information which points to an FDT containing the location of NRT content (whether locally or externally to a device). An application processor (e.g., processor 300) of the reception apparatus 20 knows the receiver IP address and differentiates it from received content address locations.

The FLUTE FDT table usually has the local memory location of services (e.g., television programs, video/audio, NRT content, interactive portals, etc.), IP addresses for RSS feeds or other NRT related data.

As described above, certain embodiments of the present disclosure allow a reception apparatus 20 to search for content on other near-by IP based locations. Thus, the need for large memories in the reception apparatus 20 to provide NRT content such as next generation broadcast services is reduced.

Further, as described above in one embodiment, NRT content is trickle downloaded to a reception apparatus 20. When the reception apparatus 20 is memory constrained, not all NRT content from all digital television channels are stored. Instead, only the NRT content for television channels most viewed by a user. Thus, in one embodiment, the memory storage is based on user viewing habits. When a user explores other television channels, the NRT could would have to be trickle downloaded to that device again from the corresponding content source 10. However, if a neighbor has that NRT content available, it can be recognized by the reception apparatus 20 and quickly accessed for viewing without the need to wait for a trickle download of the NRT content.

FIG. 15 illustrates an exemplary IP packet for the NRT content. As illustrated in FIG. 15, the packet includes source/destination addresses.

FIG. 16 illustrates an example of the information provided by the SSC in accordance with the ATSC standard A/103. Just like PAT describes services in a TS, the NRT-IT describes where NRT services are located at certain IP addresses. Each content ID (elementary service) is referenced in a FLUTE FDT. The TFT is not necessary, but provides more information about the content.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

In one embodiment, the reception apparatus 20 includes one or a combination of hardware and preinstalled programming to perform the methods described in the present disclosure. In other embodiments, one or a combination of the methods are performed by at least one TDO received and executed by the reception apparatus 20.

Numerous modifications and variations of the present disclosure are possible in light of the above teachings. It is therefore to be understood that within the scope of the appended claims, the invention may be practiced otherwise than as specifically described herein.

The above disclosure also encompasses the embodiments noted below.

(1) A reception apparatus, including a receiver configured to receive non-real-time (NRT) content included in a digital television broadcast signal broadcast from a content source; a memory configured to store the NRT content; at least one processor configured to receive a selection of the NRT content; to determine whether the selected NRT content is stored in the memory, when the at least one processor determines that the selected NRT content is not stored in the memory, to determine whether the selected NRT content can be downloaded from an external device that is accessible via a communication network, and when the at least one processor determines that the selected NRT content can be downloaded from an external device that is accessible via the communication network, to download the selected NRT content from the external device.

(2) The reception apparatus of feature (1), in which the at least one processor is configured, when the at least one processor determines that the selected NRT content cannot be downloaded from an external device that is accessible via the communication network, to download the selected NRT content from the digital television broadcast signal broadcast by the content source.

(3) The reception apparatus of feature (1) or (2), in which the receiver is configured to receive a list of the NRT content broadcast from the content source, and the at least one processor is configured to receive the selection of the NRT content from the list of the NRT content.

(4) The reception apparatus of any of features (1) to (3), in which the reception apparatus is a mobile device, the receiver is configured to receive the NRT content from a mobile network operator (MNO) that receives the digital television broadcast signal broadcast from the content source and downloads the NRT content from the digital television broadcast signal, and the at least one processor is configured to download the selected NRT content from the external device associated with the MNO.

(5) The reception apparatus of feature (4), in which the at least one processor is configured, when the at least one processor determines that the selected NRT content cannot be downloaded from an external device that is accessible via the communication network, to download the selected NRT content from an evolved Multicast Broadcast Multimedia Service (eMBMS) signal broadcast from the MNO.

(6) The reception apparatus of any of features (1) to (5), in which the content source is a digital television broadcaster, the receiver is configured to receive the digital television broadcast signal, including the NRT content, from the content source, and the at least one processor is configured to determine whether the selected NRT content can be downloaded from an external device that is accessible via the communication network based on identification information included in a Service Signaling Channel (SSC) of the digital television broadcast signal broadcast from the content source.

(7) The reception apparatus of any of features (1) to (6), in which the NRT content is associated with primary content included in the digital television broadcast signal broadcast from the content source, and the receiver is configured to receive the digital television broadcast signal that includes the NRT content and the primary content.

(8) The reception apparatus of any of features (1) to (7), in which the at least one processor is configured to determine whether the selected NRT content can be downloaded from an external device connected to a same subnet as the reception apparatus, and when the at least one processor determines that the selected NRT content cannot be downloaded from an external device connected to the same subnet as the reception apparatus, to determine whether the selected NRT content can be downloaded from an external device connected to another subnet different from the subnet of the reception apparatus.

(9) The reception apparatus of any of features (1) to (8), in which the at least one processor is configured to store a subset of the NRT content included in the digital television broadcast signal broadcast from the content source based on user preference information.

(10) A method of a reception apparatus for accessing non-real-time (NRT) content, the method including receiving, by a processor of the reception apparatus, a selection of the NRT content included in a digital television broadcast signal broadcast by a content source; determining whether the selected NRT content is stored in a memory of the reception apparatus; when the selected NRT content is determined not to be stored in the memory, determining whether the selected NRT content can be downloaded from an external device that is accessible via a communication network; and when the selected NRT content is determined to be downloadable from an external device that is accessible via the communication network, downloading the selected NRT content from the external device.

(11) The method of feature (10), further including when the selected NRT content is determined not to be downloadable from an external device that is accessible via the communication network, downloading the selected NRT content from the digital television broadcast signal broadcast by the content source.

(12) The method of feature (10) or (11), further including receiving, by a receiver of the reception apparatus, a list of the NRT content broadcast from the content source, in which the step of receiving the selection includes receiving the selection of the NRT content from the list of the NRT content.

(13) The method of any of features (10) to (12), in which the reception apparatus is a mobile device, and the step of downloading the selected NRT content from the external device includes downloading the selected NRT content from the external device associated with a mobile network operator (MNO) that receives the digital television broadcast signal and downloads the NRT content from the digital television broadcast signal.

(14) The method of feature (13), further including when the selected NRT content is determined not to be downloadable from an external device that is accessible via the communication network, downloading the selected NRT content from an evolved Multicast Broadcast Multimedia Service (eMBMS) signal broadcast from the MNO.

(15) The method of any of features (10) to (14), in which the content source is a digital television broadcaster, and the method further includes receiving, by the reception apparatus, the digital television broadcast signal, including the NRT content, from the content source, and determining whether the selected NRT content is downloadable from an external device that is accessible via the communication network based on identification information included in a Service Signaling Channel (SSC) of the digital television broadcast signal broadcast from the content source.

(16) The method of any of features (10) to (15), in which the NRT content is associated with primary content included in the digital television broadcast signal broadcast from the content source, and the method further includes receiving, by the reception apparatus, the digital television broadcast signal that includes the NRT content and the primary content.

(17) The method of any of features (10) to (16), in which the step of determining whether the selected NRT content can be downloaded from an external device that is accessible via the communication network includes determining whether the selected NRT content can be downloaded from an external device connected to a same subnet as the reception apparatus, and when the selected NRT content is determined not to be downloadable from an external device connected to the same subnet as the reception apparatus, determining whether the selected NRT content can be downloaded from an external device connected to another subnet different from the subnet of the reception apparatus.

(18) The method of any of features (10) to (17), further including storing, in the memory, a subset of the NRT content included in the digital television broadcast signal broadcast from the content source based on user preference information.

(19) A non-transitory computer-readable storage medium having embedded therein instructions which, when executed by a computer, cause the computer to perform a method for accessing non-real-time (NRT) content, the method including receiving, by a processor of a reception apparatus, a selection of the NRT content included in a digital television broadcast signal broadcast by a content source; determining whether the selected NRT content is stored in a memory of the reception apparatus; when the selected NRT content is determined not to be stored in the memory, determining whether the selected NRT content can be downloaded from an external device that is accessible via a communication network; and when the selected NRT content is determined to be downloadable from an external device that is accessible via the communication network, downloading the selected NRT content from the external device.

The invention claimed is:

1. A reception apparatus, comprising:
receiver circuitry configured to receive content included in a digital television broadcast signal broadcast from a content source;
a memory configured to store the content;
at least one processor configured to
receive or determine a selection of the content included in the digital television broadcast signal broadcast from the content source,
determine whether the same period of selected content, which is available to be downloaded from the digital television broadcast signal, is available to be downloaded from at least one external device that previously downloaded the same period of selected content from the digital television broadcast signal, the at least one external device being accessible via a communication network,
when the at least one processor determines that the same period of the selected content is available to be downloaded from the at least one external device that is accessible via the communication network, to download the same period of the selected content from the at least one external device via communication circuitry configured to communicate with the communication network, and
when the at least one processor determines that the same period of the selected content is not available for download from the at least one external device that is accessible via the communication network, to download the same period for the selected content from the digital television broadcast signal broadcast by the content source, wherein
the at least one processor is configured to
determine whether the same period of the selected content is available to be downloaded from the at least one external device associated with a same network prefix as the reception apparatus, and
determine whether the same period of the selected content is available to be downloaded from the at least one external device associated another network prefix that is different from the network prefix of the reception apparatus when the same period of the selected content is determined not to be available to be downloaded from the at least one external device associated with the same network prefix as the reception apparatus.

2. The reception apparatus according to claim 1, wherein the receiver circuitry is configured to receive a list of the content broadcast from the content source, and
the at least one processor is configured to receive the selection of the content from the list of the content.

3. The reception apparatus according to claim 1, wherein the reception apparatus is a mobile device, and
the at least one external device is associated With a mobile network operator (MNO) that receives the digital television broadcast signal broadcast from the content source and downloads the content from the digital television broadcast signal.

4. The reception apparatus according to claim 3, wherein the at least one processor is configured, when the at least one processor determines that the same period of the selected content is not available to be downloaded from the at least one external device that is accessible via the communication network, to download the same period of the selected content from an evolved Multicast Broadcast Multimedia Service (eMBMS) signal broadcast from the MNO.

5. The reception apparatus according to claim 1, wherein the content source is a digital television broadcaster,
the receiver circuitry is configured to receive the digital television broadcast signal, including the content, from the content source, and
the at least one processor is configured to determine whether the same period of the selected content is available to be downloaded from the at least one external device that is accessible via the communication network based on identification information included in a Service Signaling Channel (SSC) of the digital television broadcast signal broadcast from the content source.

6. The reception apparatus according to claim 1, wherein the content is associated with primary content included in the digital television broadcast signal broadcast from the content source, and
the receiver circuitry is configured to receive the digital television broadcast signal that includes the content and the primary content.

7. The reception apparatus according to claim 1, wherein the at least one processor is configured
to determine whether the same period of the selected content is available to be downloaded from the at least one external device connected to a same subnet as the reception apparatus, and
when the at least one processor determines that the same period of the selected content is not available to be downloaded from the at least one external device connected to the same subnet as the reception apparatus, to determine whether the same period of the selected content is available to be downloaded from another external device connected to another subnet different from the subnet of the reception apparatus.

8. The reception apparatus according to claim 1, wherein the at least one processor is configured to store a subset of the content included in the digital television broadcast signal broadcast from the content source based on user preference information.

9. The reception apparatus according to claim 1, wherein the at least one processor is configured to determine whether the same period of the selected content is available to be downloaded from the at least one external device that is accessible via the communication network before download of the period of the selected content from the digital television broadcast signal is permitted.

10. A method of a reception apparatus for accessing content, the method comprising:
receiving, by receiver circuitry of the reception apparatus, a digital television broadcast signal broadcast by a content source;
receiving or determining, by a processor of the reception apparatus, a selection of the content included in the digital television broadcast signal;
determining, by the processor, whether the same period of the selected content which is available to be downloaded from the digital television broadcast signal is available to be downloaded from at least one external device that previously downloaded the same period of selected content from the digital television broadcast signal, the at least one external device being accessible via a communication network;
when the same period of the selected content is determined to be available for download from the at least one external device that is accessible via the communication network, downloading via communication circuitry of the reception apparatus the same period of the selected content from the at least one external device, and
when the same period of the selected content is determined not to be available for download from the at least one external device that is accessible via the communication network, downloading the same period of the selected content form the digital television broadcast signal broadcast by the content source, wherein
the determining whether the same period of the selected content, which is available to be downloaded from the digital television broadcast signal, is available to be downloaded from the at least one external device includes
determining whether the same period of the selected content is available to be downloaded from the at least one external device associated with a same network prefix as the reception apparatus, and
determining whether the same period of the selected content is available to be downloaded from the at least one external device associated another network prefix that is different from the network prefix of the reception apparatus when the same period of the selected content is determined not to be available to be downloaded from the at least one external device associated with the same network prefix as the reception apparatus.

11. The method according to claim 10, further comprising:
receiving, by the receiver circuitry of the reception apparatus, a list of the content broadcast from the content source, wherein
the receiving the selection includes receiving the selection of the content from the list of the content.

12. The method according to claim 10, wherein
the reception apparatus is a mobile device, and
the at least one external device is associated with a mobile network operator (MNO) that receives the digital television broadcast signal and downloads the content from the digital television broadcast signal.

13. The method according to claim 12, further comprising:
when the same period of the selected content is determined not to be available to be downloaded from the external device that is accessible via the communication network, downloading the same period of the selected content from an evolved Multicast Broadcast Multimedia Service (eMBMS) signal broadcast from the MNO.

14. The method according to claim 10, wherein
the content source is a digital television broadcaster, and
the method further includes
receiving, by the reception apparatus, the digital television broadcast signal, including the content, from the content source, and
determining whether the same period of the selected content is available to be downloaded from the at least one external device that is accessible via the communication network based on identification information included in a Service Signaling Channel (SSC) of the digital television broadcast signal broadcast from the content source.

15. The method according to claim 10, wherein
the content is associated with primary content included in the digital television broadcast signal broadcast from the content source, and
the method further includes receiving, by the reception apparatus, the digital television broadcast signal that includes the content and the primary content.

16. The method according to claim 10, wherein the determining whether the same period of the selected content is available to be downloaded from the at least one external device that is accessible via the communication network comprises:
determining whether the same period of the selected content is available to be downloaded from the at least one external device connected to a same subnet as the reception apparatus, and
when the same period of the selected content is determined not to be available to be downloaded from the at least one external device connected to the same subnet as the reception apparatus, determining whether the same period of the selected content is available to be downloaded from another external device connected to another subnet different from the subnet of the reception apparatus.

17. The method according to claim 10, further comprising:
storing, in the memory, a subset of the content included in the digital television broadcast signal broadcast from the content source based on user preference information.

18. A non-transitory computer-readable storage medium having embedded therein instructions which, when executed by a computer, cause the computer to perform a method of a reception apparatus for accessing content, the method comprising:

causing receiver circuitry of the reception apparatus to receive a digital television broadcast signal broadcast by a content source;

receiving or determining a selection of the content included in the digital television broadcast sisal broadcast by the content source;

determining whether the same period of the selected content which is available to be downloaded from the digital television broadcast signal is available to be downloaded from at least one external device that previously downloaded the same period of selected content from the digital television broadcast signal, the at least one external device being accessible via a communication network;

when the same period of the selected content is determined to be available to be downloaded from the at least one external device that is accessible via the communication network, downloading via communication circuitry of the reception apparatus the same period of the selected content from the at least one external device, and when the same period of the selected content is determined not to be available to be downloaded from the at least one external device that is accessible via the communication network, downloading the same period of the selected content from the digital television broadcast signal broadcast by the content source, wherein the determining whether the same period of the selected content which is available to be downloaded from the digital television broadcast signal is available to be downloaded from the at least one external device includes determining whether the same period of the selected content is available to be downloaded from the at least one external device associated with a same network prefix as the reception apparatus, and determining whether the same period of the selected content is available to be downloaded from the at least one external device associated another network prefix that is different from the network prefix of the reception apparatus when the same period of the selected content is determined not to be available to be downloaded from the at least one external device associated with the same network prefix as the reception apparatus.

* * * * *

UNITED STATES PATENT AND TRADEMARK OFFICE
CERTIFICATE OF CORRECTION

PATENT NO.         : 10,257,564 B2                                     Page 1 of 1
APPLICATION NO.    : 14/046566
DATED              : April 9, 2019
INVENTOR(S)        : Luke Fay et al.

It is certified that error appears in the above-identified patent and that said Letters Patent is hereby corrected as shown below:

On the Title Page

Item (71), the Applicant's information is incorrect. Item (71), should read:
--(71) Applicant: Saturn Licensing LLC, New York, NY (US)--

Signed and Sealed this
Second Day of July, 2019

Andrei Iancu
*Director of the United States Patent and Trademark Office*